(12) United States Patent
Benoit et al.

(10) Patent No.: US 11,274,240 B2
(45) Date of Patent: Mar. 15, 2022

(54) CATIONIC FORMATION STABILIZERS COMPATIBLE WITH ANIONIC FRICTION REDUCING POLYMERS

(71) Applicant: Halliburton Energy Services, Inc., Houston, TX (US)

(72) Inventors: Denise Nicole Benoit, Houston, TX (US); Kristina Henkel Holan, Cypress, TX (US); Antonio Recio, III, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 85 days.

(21) Appl. No.: 16/507,636

(22) Filed: Jul. 10, 2019

(65) Prior Publication Data

US 2021/0009888 A1 Jan. 14, 2021

(51) Int. Cl.
*C09K 8/24* (2006.01)
*C09K 8/20* (2006.01)

(52) U.S. Cl.
CPC ............... *C09K 8/24* (2013.01); *C09K 8/206* (2013.01)

(58) Field of Classification Search
None
See application file for complete search history.

(56) References Cited

U.S. PATENT DOCUMENTS

| 3,360,043 | A | 12/1967 | Braden, Jr. et al. |
| 4,574,885 | A | 3/1986 | Horton |
| 8,157,010 | B2 | 4/2012 | Murphy et al. |
| 10,294,410 | B2 | 5/2019 | McDaniel et al. |
| 2011/0245114 | A1 | 10/2011 | Gupta et al. |
| 2012/0067585 | A1* | 3/2012 | Murphy ................. C09K 8/035 166/308.1 |
| 2014/0256599 | A1* | 9/2014 | Kelland ................ C07C 277/08 507/90 |
| 2015/0247082 | A1 | 9/2015 | Rea |
| 2017/0058182 | A1* | 3/2017 | Vo .......................... C04B 28/02 |
| 2017/0183560 | A1 | 6/2017 | McDaniel et al. |

FOREIGN PATENT DOCUMENTS

| AU | 2014402368 B2 | 2/2016 |
| CA | 2951241 A1 | 2/2016 |
| CN | 102432749 A | 5/2012 |

OTHER PUBLICATIONS

Foreign Communication from Related Application—International Search Report and Written Opinion of the International Searching Authority, International Application No. PCT/US2020/031310, dated Aug. 26, 2020, 14 pages.

(Continued)

*Primary Examiner* — Jeffrey D Washville
(74) *Attorney, Agent, or Firm* — Conley Rose, P.C.; Rodney B. Carroll

(57) ABSTRACT

A wellbore servicing fluid comprising (a) a cationic formation stabilizer having (i) a molecular weight in a range of from equal to or greater than 0.05 to equal to or less than 2.0 kiloDaltons (kDa), or (ii) cationic charge functional groups of greater than 2 to equal to or less than 5 cationic charges per molecule, or (iii) both (i) and (ii), (b) an anionic friction reducer, and (c) an aqueous fluid.

20 Claims, 9 Drawing Sheets

(56) References Cited

OTHER PUBLICATIONS

Benoit, Denise N., et al., "Formation Stabilization: Is Bigger Better in Cationic Polymers?," presented at the Unconventional Resources Technology Conference on Jul. 22-24, 2019, 17 pages.

Bedrikovetsky, Pavel, et al., "Particle Detachment Under Velocity Alternation During Suspension Transport in Porous Media," Transport in Porous Media, 2011, pp. 173-197, vol. 91, No. 1, Springer Science+Business Media B.V.

Bennion, D. B., "An Overview of Formation Damage Mechanisms Causing a Reduction in the Productivity and Injectivity of Oil and Gas Producing Formations," Journal of Canadian Petroleum Technology, Nov. 2002, pp. 29-36, vol. 41, No. 11.

Benoit, Denise, et al,. "Obtaining Comparable and Relevant Formation Swelling Sensitivity Data from CST: Is this Even Possible?," Society of Petroleum Engineers, 2016, SPE-178993-MS, pp. 1-11.

Black, Harold N., et al., "Advantageous Use of Potassium Chloride Water for Fracturing Water-sensitive Formations," Drilling and Production Practice, 1965, pp. 113-118.

Borchardt, J.K., et al., "Use of a Mineral Fines Stabilizer in Well Completions," Society of Petroleum Engineers of AIME, 1984, SPE 12757, 14 pages.

Himes, R.E., et al., "Clay Stabilization in Low-Permeability Formations," Society of Petroleum Engineers, 1989, SPE 18881, pp. 507-516, Society of Petroleum Engineers, Inc.

Himes, R.E., et al., "Environmentally Safe Salt Replacement for Fracturing Fluids," Society of Petroleum Engineers, 1991, SPE 23438, pp. 237-248, Society of Petroleum Engineers, Inc.

Hower, Wayne F., "Influence of Clays on the Production of Hydrocarbons," Society of Petroleum Engineers of AIME, 1974, SPE 4785, 11 pages, American Institute of Mining, Metallurgical, and Petroleum Engineers, Inc.

Hower, Wayne F., "Prevention and Conlrol of Formation Damage," Society of Petroleum Engineers, 1977, SPE 6472, pp. 93-94, American Institute of Mining, Metallurgical, and Petroleum Engineers, Inc.

Huang, Ching-Hua, et al., "A Study of the Effect of Polymers on Potential N-Nitrosodimethylamine (NDMA) Formation at Water and Wastewater Treatment Plants," Aug. 2011, 107 pages.

Reed, M. G., "Stabilization of Formation Clays with Hydroxy-Aluminum Solutions," Journal of Petroleum Technology, Jul. 1972, SPE 3694, pp. 860-864, American Institute of Mining, Metallurgical and Petroleum Engineers, Inc.

Tague, J.R., "Clay Stabilization Improves Sand Control," Society of Petroleum Engineers, SPE 62524, pp. 1-5, Society of Petroleum Engineers, Inc.

Williams, Lewis H., "New Polymer Offers Effective, Permanent Clay Stabilization Treatment," Journal of Petroleum Technology, Jul. 1981, SPE 8797, pp. 1211-1217, Society of Petroleum Engineers of AIME.

\* cited by examiner

CATIONIC FORMATION STABILIZERS COMPATIBLE WITH ANIONIC FRICTION REDUCING POLYMERS

TECHNICAL FIELD

The present disclosure relates to a wellbore servicing fluid and methods of using same. More specifically, the present disclosure relates to aqueous based wellbore servicing fluids comprising a cationic formation stabilizer and an anionic friction reducer.

BACKGROUND

Hydrocarbons, such as oil and gas, are often produced from wells that penetrate hydrocarbon-bearing subterranean formations or portions thereof. Conventionally, a subterranean formation is prepared for the production of oil and/or gas therefrom by drilling a wellbore into the subterranean formation. A wellbore servicing fluid may be necessary throughout the service life of a wellbore. During the drilling operation, a drilling fluid is circulated through the wellbore to remove cuttings and cool and lubricate the drilling apparatus. After the wellbore has been drilled, it is common to complete the wellbore by pumping a cementitious composition into an annular space between the casing and wellbore walls and allowing the composition to set in place. Further, completed, partially completed, and/or uncompleted wellbores are often serviced by stimulation operations to improve the recovery of hydrocarbons therefrom. Such stimulation operations include hydraulic fracturing operations, acidizing treatments, perforating operations, or the like. Stimulation operations often involve introducing various wellbore servicing fluids (e.g., a proppant-laden fracturing fluid) into at least some part of the subterranean formation at various rates, pressures, and/or amounts. Further still, other wellbore servicing operations may be necessary throughout the service life of a wellbore and thereafter, for example, clean-out operations, fluid-loss control operations, a well containment operation, a well-kill operation, or the like. Similarly, such additional servicing operations may also entail introducing servicing fluids into the subterranean formation, for example, to increase production from the wellbore, to isolate a zone or segment of the subterranean formation, to cease the production of fluids from the subterranean formation, or for some other purpose.

Formation damage can occur at any stage of a well's life and is defined as any process that reduces the propensity for production of oil or gas. The drilling and completion damage is minimized and localized, the damaged area does not represent a significant volume of the reservoir, and most of the damaged region can be easily penetrated by perforation or hydraulic fracture. In comparison, stimulation-based formation damage accounts for damage to the fracture surface, fracture pack, and the fluid leak-off zone. This means that the stimulation damage impacts a large volume of the reservoir, and more technological effort should be spent to understand the damage mechanisms and their impact on production.

Stimulation-based formation damage considers two primary effects: formation (physical) and chemical. Formation effects are typically swelling, sloughing, or generating fines, while chemical effects are insoluble residue or polymer buildup. Formation effects are driven by fluid interactions with the mineral composition of the matrix, including the type, quantity, and reactivity of clay minerals. Chemical responses are impacted by water quality, reactions, and chemical compatibilities with the treatment fluid, in-situ fluid, formation surfaces, and/or pores network. The overall sensitivity of a given formation is a combination of these responses and their potential impact on production which depends on many variables inherent to a given formation and chosen stimulation treatment.

Accordingly, there is an ongoing need for wellbore servicing fluids comprising formation stabilizers that prevents fluid-induced swelling, mechanical destabilization, and fines generation while also accounting for permanency, compatibility with anionic FR polymers, and mobility within porous media.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
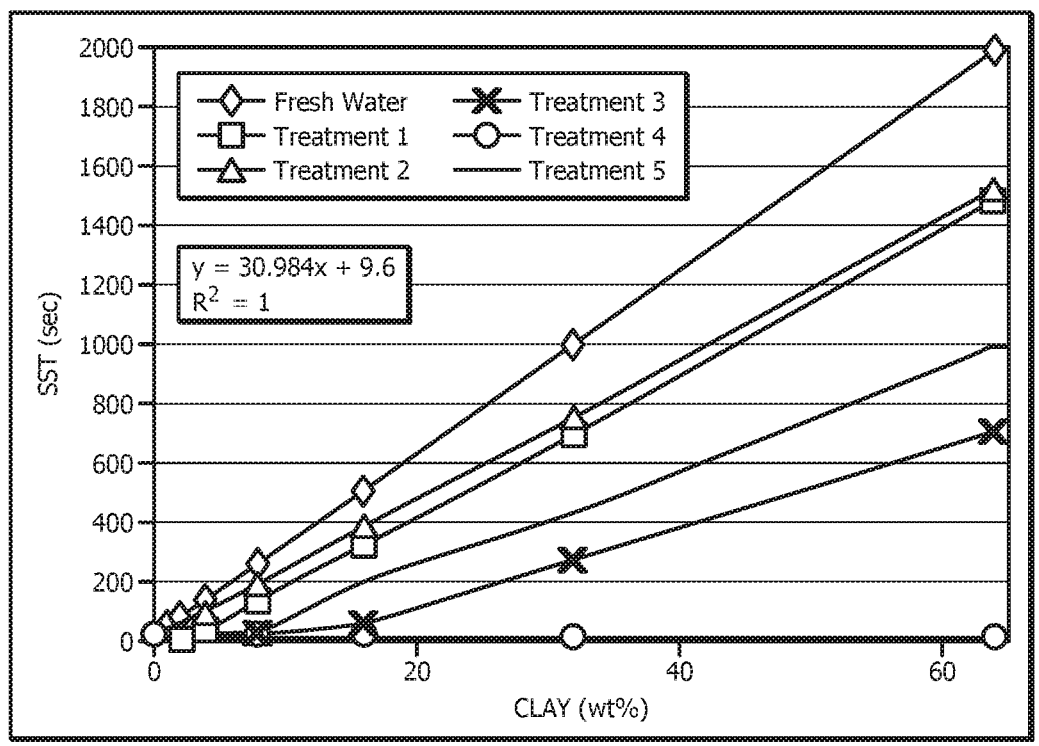
FIG. 1A shows the plot of the measured SST as a function of clay concentrations.

Disclosed herein are wellbore servicing fluids and methods of using same to service a wellbore. As used herein, a "wellbore servicing fluid" refers to a fluid used to drill, complete, work over, fracture, repair, or in any way prepare a wellbore for the recovery of materials residing in a subterranean formation penetrated by the wellbore. Examples of wellbore servicing fluids include, but are not limited to, cement slurries, drilling fluids or muds, spacer fluids, fracturing fluids or completion fluids. It is to be understood that "subterranean formation" encompasses both areas below exposed earth and areas below earth covered by water such as ocean or fresh water. The wellbore servicing fluid can comprise: (a) a cationic formation stabilizer having a molecular weight in a range of from equal to or greater than 0.05 to equal to or less than 2.0 kiloDaltons (kDa) and/or greater than 2 to equal to or less than 5 cationic charges per molecule; (b) an anionic friction reducer; and (c) an aqueous fluid. In some embodiments the wellbore servicing fluid can be placed into a wellbore penetrating a subterranean formation, wherein the subterranean formation comprises shale.

In embodiments, the wellbore servicing fluid comprises a cationic formation stabilizer having a molecular weight in a range of from equal to or greater than 0.05 to equal to or less than 2.0 kiloDaltons (kDa), alternatively having a molecular weight in a range of from equal to or greater than 0.1 to equal to or less than 1.0 kiloDaltons (kDa), alternatively having a molecular weight in a range of from equal to or greater than 0.3 to equal to or less than 1.0 kiloDaltons (kDa). Additionally or alternatively, in embodiments, the wellbore servicing fluid comprises a cationic formation stabilizer having cationic charge functional groups of greater than 2 to equal to or less than 5 cationic charges per molecule. Herein, a formation stabilizer refers to an agent with the ability to inhibit argillaceous formations from collapsing or losing integrity when the formations come in contact with an aqueous fluid. A formation stabilizer can minimize shale or clay hydration and thus prevent the absorption of water by downhole clay or shale formations to reduce a loss of wellbore stability. Alternatively, a formation stabilizer may be referred to as a clay stabilizer, a clay stabilization treatment, a clay stabilization chemical, a clay inhibitor, a shale stabilizer, a shale inhibitor, a formation stabilization material, etc.

In some embodiments, the cationic formation stabilizer can comprise an oligomer. In some embodiments, the cationic formation stabilizer is an oligomer having two or more cationic charge residues. In some embodiments, the oligomer can be composed of 2 to 20 monomeric units, wherein each monomeric unit ranges in weight from 0.01 kDa to 0.3 kDa, alternatively from 0.05 kDa to 0.3 kDa. In some embodiments, the cationic formation stabilizer can comprise an oligomer having a molecular weight in a range of from equal to or greater than 0.05 to equal to or less than 2.0 kiloDaltons (kDa), alternatively having a molecular weight in a range of from equal to or greater than 0.1 to equal to or less than 1.0 kiloDaltons (kDa), alternatively having a molecular weight in a range of from equal to or greater than 0.3 to equal to or less than 1.0 kiloDaltons (kDa).

In some embodiments, the oligomer can comprise one or more functional groups selected from the group consisting of (a) 1°-, 2°-, 3°-, or quaternary alkyl, vinyl, aryl amines; (b) 1°-, 2°-, 3°-, or quaternary alkyl, vinyl, aryl, cyclic amines; (c) 1°-, 2°-, 3°-, or quaternary cyclic alkyl, vinyl, aryl, diamines; (d) 1°-, 2°-, 3°-, or quaternary cyclic alkyl, vinyl, aryl, triamines; (e) 1°-, 2°-, 3°-, or quaternary alkyl, vinyl, aryl, aminoalcohol moieties; (f) diol or glycerol alcohol moiety; (g) 1,2-propanediol-3-trialkyl ammonium salts; (h) aminoacid moiety; (i) 1°-, 2°-, 3°-, or quaternary alkyl, vinyl, aryl, aminoformamidine; (j) 1°-, 2°-, 3°-, or quaternary alkyl, vinyl, aryl, cyclic aminoformamidine; (k) 1°-, 2°-, 3°-, or quaternary pyridinylmethly-aminoformamidine; (l) 1°-, 2°-, 3°-, or quaternary aceto-aminoformamidine; (m) bisquaternary amine; (n) betaine monohydrate; and (o) combinations thereof.

Nonlimiting examples of cationic formation stabilizers suitable for use in the present disclosure in the wellbore servicing fluid include arginine, lysine, polylysine, guanidine, ethoxylated amines, polyoxyalkylene amines, polyoxyethylene amines, polyoxypropylene amines, polyoxyalkylene cocamines, polyoxyethylene cocamines, polyoxypropylene cocamines, polyoxyalkylene tallow amines, polyoxyethylene tallow amines, polyoxypropylene tallow amines, polyoxyalkylene lauryl amines, polyoxyethylene lauryl amines, polyoxypropylene lauryl amines polyoxyalkylene amidoamines, polyoxypropylene amidoamine, polyether amines, polyether diamine, polyamino polyether, and the like, or combinations thereof. In some embodiments, an oligomer can comprise two or more repeating groups derived from one or more of the foregoing compounds.

Additional nonlimiting examples of cationic formation stabilizers suitable for use in the present disclosure in the wellbore servicing fluid include compounds according to Structure I, II, or III:

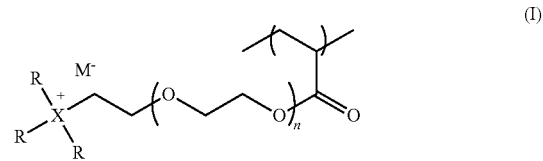

(I)

1) n = 1-15, X = N, R = $CH_2CH_3$;
M = any halogen, sulfate, sulfonate
2) n = 1-15, X = P, R = $CH_2CH_3$;
M = any halogen, sulfate, sulfonate
3) n = 1-15, X = P, R = $C(CH_3)_3$;
M = any halogen, sulfate, sulfonate
4) n = 1-15, X = P, R = $(CH_2)_3OH$;
M = any halogen, sulfate, sulfonate
5) n = 1-15, X = P, R = $C_6H_5$;
M = any halogen, sulfate, sulfonate

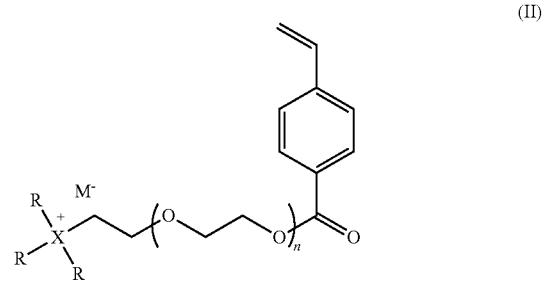

(II)

6) n = 1-15, X = N, R = $CH_2CH_3$;
M = any halogen, sulfate, sulfonate
7) n = 1-15, X = P, R = $CH_2CH_3$;
M = any halogen, sulfate, sulfonate
8) n = 1-15, X = P, R = $C(CH_3)_3$;
M = any halogen, sulfate, sulfonate
9) n = 1-15, X = P, R = $(CH_2)_3OH$;
M = any halogen, sulfate, sulfonate
10) n = 1-15, X = P, R = $C_6H_5$;
M = any halogen, sulfate, sulfonate

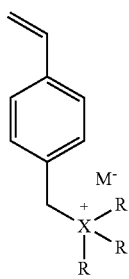

(III)

11) X = N, R = CH₂CH₃; M = any halogen, sulfate, sulfonate
12) X = P, R = CH₂CH₃; M = any halogen, sulfate, sulfonate
13) X = P, R = C(CH₃)₃; M = any halogen, sulfate, sulfonate
14) X = P, R = (CH₂)₃OH; M = any halogen, sulfate, sulfonate
15) X = P, R = C₆H₅; M = any halogen, sulfate, sulfonate In some embodiments, the cationic formation stabilizer can comprise a cationic guanidine compound.

In some embodiments, the cationic formation stabilizer can comprise a cationic guanidinium-containing compound (GCC) comprising the moiety of Structure IV:

Structure IV

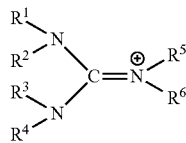

$R^1$, $R^2$, $R^3$, $R^4$, $R^5$ and $R^6$ can each independently be hydrogen, a halogen or an organyl group and the GCC can have a molecular weight ranging from about 50 Daltons (Da) to about 2000 Daltons (Da), alternatively from about 50 Da to about 1000 Da, or alternatively from about 400 Da to about 2000 Da. The term "organyl group" as used herein refers to the definition specified by IUPAC: an organic substituent group, regardless of functional type, having one free valence at a carbon atom. Non-limiting examples of organyl groups suitable for use in the present disclosure include ethers, aldehydes, ketones, esters, sulfides, amines and any combination thereof. In some embodiments, $R^1$, $R^2$, $R^3$, $R^4$, $R^5$ and $R^6$ each independently can be fluorine, chlorine, bromine, or iodine. In some embodiments, $R^1$, $R^2$, $R^3$, $R^4$, $R^5$ and $R^6$ each independently are an alkyl group; alternatively, a $C_1$ to $C_{20}$ alkyl group; alternatively, a $C_1$ to $C_{10}$ alkyl group or alternatively a $C_1$ to $C_5$ alkyl group. In some embodiments, $R^1$, $R^2$, $R^3$, $R^4$, $R^5$ and $R^6$ each independently are a methyl group, an ethyl group, a propyl group, a butyl group, a pentyl group; an n-butyl group, a sec-butyl group, an isobutyl group, a tert-butyl group, an n-pentyl group, a 2-pentyl group, a 3-pentyl group, a 2-methyl-1-butyl group, a tert-pentyl group, a 3-methyl-1-butyl group, a 3-methyl-2-butyl group, or a neo-pentyl group. The GCC is cationic by virtue of the presence of a nitrogen atom doubled bonded to the central carbon and also bonded to two other substituents.

In some embodiments, the GCC is an oligomer as represented by the compound of Structure V:

Structure V

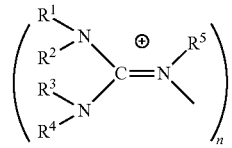

For example, the GCC may be an oligomer: (i) having a number of repeating units (n) effective to provide a molecular weight ranging from about 50 Daltons to about 2000 Daltons, alternatively from about 300 Da to about 1000 Da; (ii) comprising at least one guanidinium group; and (iii) comprising any suitable number of guanidine groups. In some embodiments, the guanidine groups, the guanidinium groups or both are unsubstituted. Alternatively, the guanidine groups, the guanidinium groups or both are substituted. In embodiments where the GCC comprises substituted guanidine groups and substituted guanidinium groups, the substituents may be the same or different. Suitable substituents are described herein.

It is to be understood that the guanidine groups may be present in any amount to provide some user and/or process goal while the guanidinium is both the cation of the GCC and also confers properties to the shale stabilizer as described herein.

In some embodiments, the GCC is an oligomer as represented by Structure V where the individual monomers (e.g., guanidinium and guanidine groups) are connected to one another via a hydrocarbyl linker having from about 1 to about 30 carbon atoms, alternatively from about 1 to 20 carbon atoms or alternatively from about 1 to 10 carbon atoms.

The GCC can further comprise an anionic counterion. The anionic counterion can be any anionic counterion compatible with the GCC and the other components of the wellbore servicing fluid. Nonlimiting examples of anionic counterions suitable for use in the present disclosure include fluoride, chloride, iodide, bromide, nitrate, hydrogen sulfate, dihydrogen phosphate, bicarbonate, nitrite, perchlorate, iodate, chlorate, bromate, chlorite, hypochlorite, hypobromite, cyanide, amide, cyanate, hydroxide, permanganate, acetate, formate, oxide, sulfide, nitride, arsenate, phosphate, arsenite, hydrogen phosphate, sulfate, thiosulfate, sulfite, carbonate, chromate, dichromate, peroxide, and oxalate.

For any particular compound disclosed herein, the general structure or name presented is also intended to encompass all structural isomers, conformational isomers, and stereoisomers that can arise from a particular set of substituents, unless indicated otherwise. For any particular formula or name that is presented, any general formula or name presented also encompasses all conformational isomers, regioisomers, and stereoisomers that can arise from a particular set of substituents.

The GCC can be free of complexation with polyvalent metals. Complexation can be at least one interaction with the metal chosen from at least one of ionic, covalent, dipole-dipole, London dispersion force, and hydrogen bonding, wherein the interaction is of sufficient strength that a stable complex between the guanidine or guanidinium and the metal is formed. For example, the guanidine and guanidinium can be free of complexation with metals, such as aluminum. For example, the guanidine and guanidinium can be free of complexation with aluminum hydroxide, sodium aluminate, aluminum sulfate, and aluminum phosphate.

The cationic formation stabilizer can be present in the wellbore servicing fluid in an amount in a range of from about 0.001 weight percent to about 3 weight percent, alternatively from about 0.001 weight percent to about 2 weight percent, alternatively from about 0.001 weight percent to about 1 weight percent, alternatively from about 0.05 weight percent to about 1 weight percent, alternatively from about 0.01 weight percent to about 0.6 weight percent, alternatively from about 0.02 weight percent to about 0.04 weight percent based on the total weight of the wellbore servicing fluid.

In embodiments, the wellbore servicing fluid comprises an anionic friction reducer. In some embodiments, the anionic friction reducer has a molecular weight in a range of equal to or greater than 5 MM Da to equal to or less than 25 MM Daltons (Da), alternatively in a range of equal to or greater than 12 MM Da to equal to or less than 25 MM Daltons (Da).

In some embodiments, the wellbore servicing fluid as disclosed herein, wherein the anionic friction reducer comprises one or more functional groups selected from the group consisting of (a) alkyl-, vinyl-, aryl-, amide; (b) dialkyl-, divinyl-, diaryl-, amide; (c) carboxylic acid; (d) carboxylic acid mono- or multi-valent metal salt; (e) carboxylic acid ammonium salt; (f) carboxylic acid alkyl-, vinyl-, aryl ammonium salt; (g) carboxylic acid oxyethyltrimethylammonium salt; (h) carboxy-1-propanesulfonic acid; (i) carboxy-1-proanesulfonic acid mono- and multivalent salts; (j) Sulfopropyl salt; (k) Amido-2-methylpropane sulfonic acid; (l) Amido-2-methylpropane sulfonic acid mono- or multi-valent metal salt; (m) amidopropyl timethylammonium salt; (n) carboxylic acid methyl(C1)- thru octydecyl(C18) ester; and (o) combinations thereof.

The anionic friction reducers disclosed herein can be used to decrease friction pressure during pumping. The anionic friction reducer(s) in each of the fluid blends can be a naturally occurring polymer (e.g., a polysaccharide), a derivative of a naturally occurring polymer, or a synthetic polymer (e.g. a polyacrylamide). The anionic friction reducer can be water-soluble. The anionic friction reducer can have an average molecular weight in the range of from about 50,000 Da to 20,000,000 Da, about 100,000 Da to about 4,000,000 Da, or about 2,000,000 Da to about 3,000,000 Da. The anionic friction reducer should be present in a fluid blend in a form and in a concentration that is sufficient to impart the desired viscosity to the fluid blend.

In some embodiments, the friction reducer may comprise any suitable anionic friction reducer compatible with the cationic formation stabilizer. In some embodiments, the friction reducer comprises a hydratable anionic friction reducer. The hydratable anionic friction reducer may be effective to reduce friction between a servicing fluid comprising the anionic friction reducer and a conduit through which the servicing fluid is communicated. In some embodiments, the hydratable anionic friction reducer comprises a polymer. Nonlimiting examples of a suitable polymer include a polyacrylamide, polyacrylate, a copolymer of polyacrylamide and polyacrylate, a copolymer of polyacrylamide and 2-acrylamido-2-methylpropane sulfonic acid (AMPS), polyethylene oxide, polypropylene oxide, a copolymer of polyethylene and polypropylene oxide, polysaccharides, or combinations thereof. Examples of suitable anionic friction reducers that are commercially available are friction reducers offered under the designations or brand names FightR™ EC-1, FightR™ EC-2, FightR™ EC-4, FightR™ LX-5, FightR™ LX-6, WG-36™, FDP-S1183-15™, FDP-S1261-16™, FDP-S1278-17™, FDP-S1308-17™, FDP-S1325-18™, FDP-S1326-18™, FDP-S1332-18™, FDP-S1346-18™, FDP-S1351-18™, FDP-S1357-19™, FR-46™, FR-56™, FR-58™, FR-66™, FDP-S944-09™, SGA-2™, SGA-5™, and SGA-18™ from Halliburton Energy Services, Inc.

The anionic friction reducer can be present in the wellbore servicing fluid in an amount in a range of from about 0.001 weight percent to about 3 weight percent, alternatively from about 0.01 weight percent to about 2 weight percent, alternatively from about 0.01 weight percent to about 1 weight percent, alternatively from about 0.05 weight percent to about 1 weight percent, alternatively from about 0.01 weight percent to about 0.04 weight percent, alternatively from about 0.075 weight percent to about 0.9 weight percent, alternatively from about 0.1 weight percent to about 0.7 weight percent based on the total weight of the wellbore servicing fluid.

In embodiments, the wellbore servicing fluid comprises an aqueous fluid (e.g., an aqueous base fluid). A fluid is considered to be "aqueous" herein if the fluid comprises water alone or if the fluid contains water. The aqueous fluid may include, but is not limited to, freshwater, seawater, saltwater, or brines (e.g., natural brines, formulated brines, etc.), or a mixture thereof. The formulated brines may be produced by dissolving one or more soluble salts in water, a natural brine, or seawater. Representative soluble salts include the chloride, bromide, acetate, and formate salts of potassium, sodium, calcium, magnesium, and zinc.

The aqueous fluid can be present in the wellbore servicing fluid in an amount in a range of from about 1 weight percent to about 99.999 weight percent, alternatively from about 50 weight percent to about 99.999 weight percent, alternatively from about 75 weight percent to about 99.999 weight percent. In some embodiments, the aqueous base fluid comprises the remainder of the wellbore servicing composition after all remaining ingredients have been accounted for.

In some embodiments, the wellbore servicing fluid as disclosed herein can further comprise a proppant. The proppant may be a naturally-occurring material, a synthetic material, or a combination thereof. Examples of proppants suitable for use in this disclosure include without limitation ground or crushed shells of nuts such as walnut, pecan, almond, ivory nut, brazil nut, etc.; ground or crushed seed shells (including fruit pits) of seeds of fruits such as plum, peach, cherry, apricot, etc.; ground or crushed seed shells of other plants such as maize (e.g. corn cobs or corn kernels), etc., crushed fruit pits or processed wood materials such as those derived from woods such as oak, hickory, walnut, poplar, mahogany, etc. including such woods that have been processed by grinding, chipping, or other form of particleization, glass, sintered bauxite, quartz, aluminum pellets, silica (sand) (such as Ottawa, Brady or Colorado Sands), synthetic organic particles such as nylon pellets, ceramics (such as aluminosilicates), or mixtures thereof. In some embodiments, the proppant comprises sand, for example a naturally-occurring sand and/or a resin-coated naturally-occurring sand.

In embodiments, the proppant is equal to or greater than 325 mesh in size, alternatively is equal to or greater than 100 mesh in size, or alternatively is equal to or greater than 40/70 mesh in size.

In some embodiments, a proppant may be present in the wellbore servicing fluid in an amount of to provide a proppant density ranging from greater than 0 pounds per gallon (ppg) to about 20 ppg, alternatively from about 1 ppg to about 20 ppg, or alternatively from about 5 ppg to about 20 ppg, based on the total weight of the wellbore servicing fluid.

In some embodiments, the wellbore servicing fluid as disclosed herein can further comprise a gelling agent. In some embodiments, the gelling agent has a molecular weight in a range of equal to or greater than 1.2 MM Da to equal to or less than 5 MM Daltons (Da).

In some embodiments, the gelling agent can further comprise a guar, hydrdoxypropyl guar (HPG), Carboxymethyl guar (CMG), Carboxymethyl hydroxyl propyl guar (CMHPG), Hydroxyethyl cellulose (HEC), Carboxymethyl hydroxyethyl cellulose, Carboxymethyl cellulose (CMC), Xanthan, Pectins, Diutans, or combinations thereof.

In some embodiments, the gelling agent can be present in the wellbore servicing fluid in an amount in a range of from about 0.01 weight percent to about 3 weight percent, alternatively from about 0.01 weight percent to about 2 weight percent, alternatively from about 0.01 weight percent to about 1 weight percent, alternatively from about 0.1 weight percent to about 1 weight percent, alternatively from about 0.3 weight percent to about 0.85 weight percent, alternatively from about 0.5 weight percent to about 0.75 weight percent based on the total weight of the wellbore servicing fluid.

In some embodiments, the cationic formation stabilizer produces equal to or less than 0.5 mg/pore volume (PV) of fines as determined by measuring the amount of fine particulate particles emitted from a 1-inch inside diameter, 10-inch length sandpack column comprising 10% illite at a treatment flow rate ranging from 5 to 25 mL/min of the servicing fluid. In some embodiments, the cationic formation stabilizer produces equal to or less than 0.5 mg/pore volume (PV) of fines when tested in accordance with the procedure set forth in Example 1.

In some embodiments, the cationic formation stabilizer has a permanency of equal to or greater than 30 pore volumes (PV) as determined by measuring the amount of fine particulate particles in mg/PV emitted from a 1-inch inside diameter and 10-inch length of a previously treated sandpack column comprising 10% illite at a flow rate ranging from 5 to 25 mL/min of water and the amount of fine particular particles recovered does not exceed 0.5 mg/PV prior to at least 30 PVs of water being passed through the previously treated sandpack column. In some embodiments, the cationic formation stabilizer has a permanency of equal to or greater than 30 pore volumes (PV) when tested in accordance with the procedure set forth in Example 1.

In some embodiments, the cationic formation stabilizer and the anionic friction reducer are compatible with one another. For example, compatibility is evidenced where the cationic formation stabilizer and the anionic friction reducer (e.g., FR polymer) are visibly clear when mixed in an aqueous solution, there are no large insoluble residues, and/or the aqueous solution is free of cloudy/precipitate.

In further examples, the cationic formation stabilizer and the anionic friction reducer are compatible when tested in accordance with the procedure set forth in Example 1, e.g., no indications of a coacervate or precipitate formation upon visual observation.

In further examples, compatibility is evidenced if upon addition of a cationic formation stabilizer to a base solution of an anionic friction reducer (e.g., FR polymer), a turbidity readings of the combined solution increases by less than 20 nephelometric turbidity units (NTU), alternatively less than 10 NTU. The units of turbidity from a calibrated nephelometer are called Nephelometric Turbidity Units (NTU). A nephelometer is an instrument, which measures the intensity of light scattered at 90 degrees as a beam of light passes through a particle suspended liquid sample. A nephelometer has a single illumination beam light source and a single detector, the peak spectral output of the light source is 400-680 nm.

In further examples, compatibility is evidenced where the cationic formation stabilizer and the anionic friction reducer (e.g., FR polymer) achieve >60% friction reduction on a friction loop test. In the friction loop test, the tested fluid is circulated through a test pipe at 10 gal/min, where the flow within the testing section was in a turbulent zone and the corresponding wall shear rate is similar to that observed in a wellbore in common waterfrac stimulations. The friction performance (known as % friction reduction, % FR) is calculated based on the ratio between the measured pressure drop of the tested fluids and the theoretical pressure drop of water at the same test conditions. For each test, if the friction reduction at 5 minutes post injection remains greater than 60% indicates no loss of performance with the anionic friction reduction polymer in a mixture with the cationic formation stabilizer and good compatibility.

The ratio of the molecular weight of the anionic friction reducer to the molecular weight of the cationic formation stabilizer can be in a range of equal to or greater than about 10,000:1 to less than or equal to about 10,000,000:1, alternatively in a range of equal to or greater than about 10,000:1 to less than or equal to about 1,000,000:1, or alternatively in a range of equal to or greater than about 10,000:1 to less than or equal to about 100,000:1.

Figure 10:
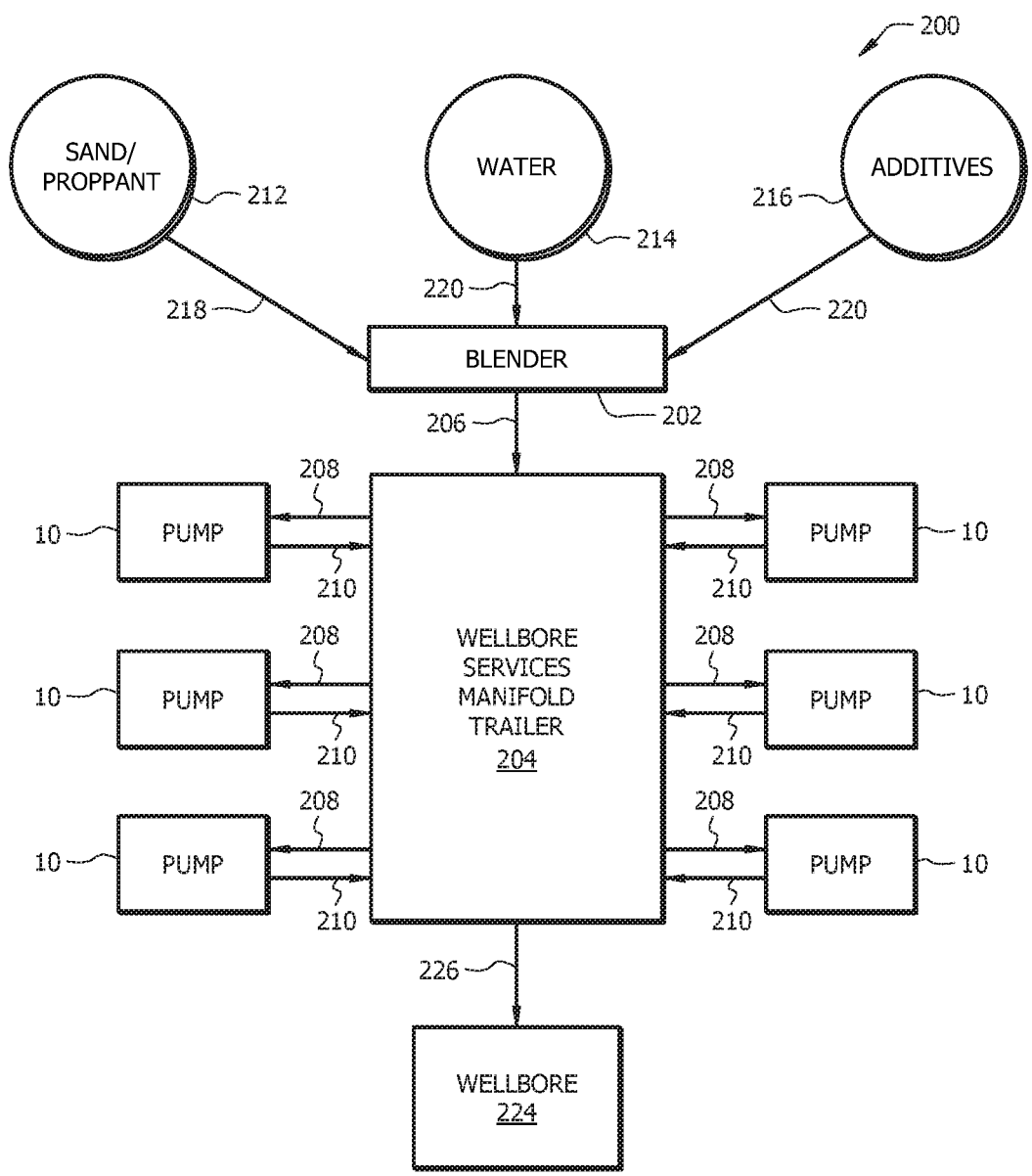
FIG. 10 shows an embodiment of a wellbore servicing system 200.

The cationic formation stabilizer, the anionic friction reducer, the aqueous fluid, and any additional components can be blended together in any suitable order to form the wellbore servicing fluid. In some embodiments, the wellbore servicing fluid may be prepared and used in accordance with the description of wellbore servicing system 200 of FIG. 10. In a particular embodiment, the wellbore servicing fluid is a proppant-laden fracturing fluid that may be prepared and used in accordance with the description of wellbore servicing system 200 of FIG. 10. In some embodiments, the attributes of one or more of the components of the wellbore servicing fluid may vary from one servicing operation to another. Further, the components of a wellbore servicing fluid of the type disclosed herein or the relative amounts thereof may vary from one servicing operation to another and/or throughout the course of a given servicing operation.

A wellbore servicing fluid of the type described herein may be used to carry out a wellbore servicing operation by placing the wellbore service fluid of the type described herein in a wellbore. In some embodiments, the wellbore servicing fluid (e.g., a fracturing fluid) is placed in the wellbore and contacts one or more surfaces of a subterranean formation (e.g., a shale formation), for example a formation face formed by the wellbore (e.g., a wellbore wall), a formation face formed by one or more fractures induced into the subterranean formation penetrated by the wellbore (e.g., a fracture face), etc.

In some embodiments, the wellbore servicing fluid (e.g., a fracturing fluid) of the type described herein can be placed into a wellbore penetrating a subterranean formation, wherein the subterranean formation comprises shale. Accordingly, in some embodiments, the subterranean formation comprises a shale formation. In some embodiments, the formation is a North American shale formation. Herein, shale formations are one of the most common sedimentary rocks in the crust of the earth. A shale formation forms mainly from silt and clay-size mineral particles. Shale formations are fissile and laminated. Shale formations can be both source rocks and seal rocks for oil and gas reservoirs. Each shale formation may have different depth, thickness, and geological characteristics. Generally there are two types of shale formations: dark colored shale formations and light colored shale formations. Dark color generally indicates rich organic matters in a shale formation. Most of the organic rich shale formations have been identified in different regions of the world (e.g., Barnett Shale of Texas).

In some embodiments, the wellbore servicing fluid (e.g., a fracturing fluid) of the type described herein can be placed into a wellbore penetrating a subterranean formation, wherein the subterranean formation comprises shale, wherein the shale comprises nanopores having pore radii of less than 10 nm and wherein the cationic formation stabilizer oligomer has a molecular weight in a range of from equal to or greater than 0.1 to equal to or less than 0.5 kDa.

In some embodiments, the wellbore servicing fluid (e.g., a fracturing fluid) of the type described herein can be placed into a wellbore penetrating a subterranean formation, wherein the subterranean formation comprises shale and wherein the subterranean formation has an ultra-low permeability, for example a permeability in a range of from equal to or greater than 1 nD to equal to or less than 500 nD (nanoDarcy). In some embodiments, a hydraulic fracturing treatment is performed on a shale formation having a permeability in the 1- to 500-nD range.

In some embodiments, the wellbore servicing fluid (e.g., a fracturing fluid) of the type described herein can be placed into a wellbore penetrating a subterranean formation, wherein the subterranean formation comprises shale and wherein the shale has a clay content of from 1 to 70 weight percent, alternatively from about 10 to about 60 weight percent, alternatively from about 20 to about 50 weight present, alternatively from about 20 to about 40 weight percent, alternatively from about 25 to about 35 weight percent, or alternatively about 30 weight percent.

In some embodiments, the wellbore servicing fluid (e.g., a fracturing fluid) of the type described herein can be placed into a wellbore penetrating a subterranean formation, wherein the subterranean formation comprises shale and wherein the shale has a cation exchange capacity (CEC) from 0 to about 30 milli-equivalence (meq)/100 g, alternatively from about 1 to about 20 meq/100 g, alternatively from about 2 to about 10 meq/100 g, alternatively from about 3 to about 7meq/100 g, alternatively from about 4 to about 5 meq/100 g, or alternatively about 4.5 meq/100 g, indicating low to moderate reactivity.

Also disclosed is a wellbore servicing system 200 and methods of preparing a wellbore servicing fluid of the type described herein and performing a wellbore servicing operation using same. An embodiment of a wellbore servicing system 200 and a method of servicing a wellbore via the wellbore servicing system 200 will now be described with reference to FIG. 10, which is a schematic representation of an embodiment of a wellbore servicing system 200, according to embodiments of this disclosure.

It will be appreciated that the wellbore servicing system 200 disclosed herein can be used to prepare a wellbore servicing fluid of the type described herein for use in an associated wellbore servicing operation. In embodiments, the wellbore servicing system 200 may be used to service a wellbore that penetrates a subterranean formation by pumping a wellbore servicing fluid into the wellbore and/or subterranean formation. As used herein, a "wellbore servicing fluid" or "servicing fluid" refers to a fluid used to drill, complete, work over, fracture, repair, or in any way prepare a well bore for the recovery of materials residing in a subterranean formation penetrated by the well bore. It is to be understood that "subterranean formation" encompasses both areas below exposed earth and areas below earth covered by water such as ocean or fresh water. Examples of servicing fluids suitable for use as the wellbore servicing fluid, the another wellbore servicing fluid, or both include, but are not limited to, cementitious fluids (e.g., cement slurries), drilling fluids or muds, spacer fluids, fracturing fluids, completion fluids, gravel pack fluids, remedial fluids, perforating fluids, diverter fluids, sealants, gelation fluids, polymeric fluids, aqueous fluids, oleaginous fluids, etc.

In embodiments, the wellbore servicing system 200 comprises one or more pumps operable to perform oilfield and/or well servicing operations. Such operations may include, but are not limited to, drilling operations, fracturing operations, perforating operations, fluid loss operations, primary cementing operations, secondary or remedial cementing operations, or any combination of operations thereof.

In embodiments, the wellbore servicing system 200 may be a system such as a fracturing spread for fracturing wells in a hydrocarbon-containing reservoir. In fracturing operations, wellbore servicing fluids, such as particle laden fluids, are pumped at high-pressure into a wellbore. The particle laden fluids may then be introduced into a portion of a subterranean formation at a sufficient pressure and velocity to cut a casing and/or create perforation tunnels and fractures within the subterranean formation. Proppants, such as grains of sand, are mixed with the wellbore servicing fluid to keep the fractures open so that hydrocarbons may be produced from the subterranean formation and flow into the wellbore. Hydraulic fracturing may desirably create high-conductivity fluid communication between the wellbore and the subterranean formation.

The wellbore servicing system 200 comprises a blender 202 that is coupled to a wellbore services manifold trailer 204 via flowline 206. As used herein, the term "wellbore services manifold trailer" includes a truck and/or trailer comprising one or more manifolds for receiving, organizing, and/or distributing wellbore servicing fluids during wellbore servicing operations. In this embodiment, the wellbore services manifold trailer 204 is coupled to six positive displacement pumps (e.g., a pump 10 that may be mounted to a trailer and transported to the wellsite via a semi-tractor) via outlet flowlines 208 and inlet flowlines 210. In alternative embodiments, however, there may be more or less pumps used in a wellbore servicing operation. Outlet flowlines 208 are outlet lines from the wellbore services manifold trailer 204 that supply fluid to the pumps 10. Inlet flowlines 210 are inlet lines from the pumps 10 that supply fluid to the wellbore services manifold trailer 204.

The blender 202 mixes solid and fluid components to achieve a well-blended wellbore servicing fluid. As depicted, sand or proppant 212, water 214, and additives 216 are fed into the blender 202 via feedlines 218, 220, and 212, respectively. The water 214 may be potable, non-potable, untreated, partially treated, or treated water. In embodiments, the water 214 may be produced water that has been extracted from the wellbore while producing hydrocarbons form the wellbore. The produced water may comprise dissolved and/or entrained organic materials, salts, minerals, paraffins, aromatics, resins, asphaltenes, and/or other natural or synthetic constituents that are displaced from a hydrocarbon formation during the production of the hydrocarbons. In embodiments, the water 214 may be flowback water that has previously been introduced into the wellbore during wellbore servicing operation. The flowback water may comprise some hydrocarbons, gelling agents, friction reducers, surfactants and/or remnants of wellbore servicing fluids previously introduced into the wellbore during wellbore servicing operations.

The water 214 may further comprise local surface water contained in natural and/or manmade water features (such as ditches, ponds, rivers, lakes, oceans, etc.). Still further, the water 214 may comprise water stored in local or remote containers. The water 214 may be water that originated from near the wellbore and/or may be water that has been transported to an area near the wellbore from any distance. In some embodiments, the water 214 may comprise any combination of produced water, flowback water, local surface water, and/or container stored water. In some implementations, water may be substituted or supplemented by nitrogen or carbon dioxide, for example in a foaming condition.

In embodiments, the blender 202 may be an Advanced Dry Polymer (ADP™) blender and the additives 216 are dry blended and dry fed into the blender 202. In alternative embodiments, however, additives may be pre-blended with water using other suitable blenders, such as, but not limited to, a Gel-Pro™ blender, which is a commercially available preblender trailer from Halliburton Energy Services, Inc., to form a liquid gel concentrate that may be fed into the blender 202. The mixing conditions of the blender 202, including time period, agitation method, pressure, and temperature of the blender 202, may be selected to produce a homogeneous blend having a desirable composition, density, and viscosity. In alternative embodiments, however, sand or proppant, water, and additives may be premixed and/or stored in a storage tank before entering a wellbore services manifold trailer 204.

In embodiments, the pump(s) 10 pressurize the wellbore servicing fluid to a pressure suitable for delivery into a wellbore 224 or wellhead. For example, the pumps 10 may increase the pressure of the wellbore servicing fluid (e.g., the wellbore servicing fluid and/or the another wellbore servicing fluid) to a pressure of greater than or equal to about 3,000 psi, 5,000 psi, 10,000 psi, 20,000 psi, 30,000 psi, 40,000 psi, or 50,000 psi, or higher.

From the pumps 10, the wellbore servicing fluid may reenter the wellbore services manifold trailer 204 via inlet flowlines 210 and be combined so that the wellbore servicing fluid may have a total fluid flow rate that exits from the wellbore services manifold trailer 204 through flowline 226 to the flow connector wellbore 1128 of between about 1 BPM to about 200 BPM, alternatively from between about 50 BPM to about 150 BPM, alternatively about 100 BPM. In embodiments, each of one or more pumps 10 discharge wellbore servicing fluid at a fluid flow rate of between about 1 BPM to about 200 BPM, alternatively from between about 50 BPM to about 150 BPM, alternatively about 100 BPM. In embodiments, each of one or more pumps 10 discharge wellbore servicing fluid at a volumetric flow rate of greater than or equal to about 3, 10, or 20 barrels per minute (BPM), or in a range of from about 3 to about 20, from about 10 to about 20, or from about 5 to about 20 BPM.

The flowlines described herein can be piping segments that are connected together for example via flanges, collars, welds, etc. These flowlines may include various configurations of pipe tees, elbows, and the like. These flowlines connect together the various wellbore servicing fluid process equipment described herein.

Also disclosed herein are methods for servicing a wellbore using a wellbore servicing fluid of the type disclosed herein. Without limitation, servicing the wellbore may include: positioning the wellbore servicing composition in the wellbore 224 (e.g., via one or more pumps 10 as described herein) to isolate the subterranean formation from a portion of the wellbore; to fracture a portion of the subterranean formation; to support a conduit in the wellbore; to plug a void or crack in the conduit; to plug a void or crack in a cement sheath disposed in an annulus of the wellbore; to plug a perforation; to plug an opening between the cement sheath and the conduit; to prevent the loss of aqueous or nonaqueous drilling fluids into loss circulation zones such as a void, vugular zone, or fracture; to plug a well for abandonment purposes; to divert treatment fluids; and/or to seal an annulus between the wellbore and an expandable pipe or pipe string. In other embodiments, the wellbore servicing systems and methods may be employed in well completion operations such as primary and secondary cementing operation to isolate the subterranean formation from a different portion of the wellbore.

In embodiments, a wellbore servicing method may comprise transporting a positive displacement pump (e.g., pump 10) to a site for performing a servicing operation. Additionally or alternatively, one or more pumps may be situated on a suitable structural support. Non-limiting examples of a suitable structural support or supports include a trailer, truck, skid, barge or combinations thereof. In embodiments, a motor or other power source for a pump may be situated on a common structural support.

In embodiments, a wellbore servicing method may comprise providing a source for a wellbore servicing fluid. As described above, the wellbore servicing fluid may comprise any suitable fluid or combinations of fluid as may be appropriate based upon the servicing operation being performed. Non-limiting examples of suitable wellbore servicing fluid include a fracturing fluid (e.g., a particle laden fluid, as described herein), a perforating fluid, a cementitious fluid, a sealant, a remedial fluid, a drilling fluid (e.g., mud), a spacer fluid, a gelation fluid, a polymeric fluid, an aqueous fluid, an oleaginous fluid, an emulsion, various other wellbore servicing fluids, and combinations thereof. The wellbore servicing fluid may be prepared on-site (e.g., via the operation of one or more blenders) or, alternatively, transported to the site of the servicing operation.

In embodiments, a wellbore servicing method may comprise fluidly coupling a pump 10 to the wellbore servicing fluid source. As such, wellbore servicing fluid may be drawn into and emitted from the pump 10. Additionally or alternatively, a portion of a wellbore servicing fluid placed in a wellbore 224 may be recycled, i.e., mixed with the water stream obtained from a water source and treated in fluid treatment system. Furthermore, a wellbore servicing method may comprise conveying the wellbore servicing fluid from its source to the wellbore via the operation of the pump 10.

EXAMPLES

The embodiments having been generally described, the following examples are given to demonstrate the practice and advantages thereof. It is understood that the examples are given by way of illustration and are not intended to limit the specification or the claims in any manner. The examples herein demonstrate the advantageous and unexpected results obtained from performing a wellbore servicing operation (e.g., fracturing) using a wellbore servicing fluid of the type described herein (e.g., a wellbore servicing fluid comprising (a) a cationic formation stabilizer having a molecular weight in a range of from equal to or greater than 0.1 to equal to or less than 1.0 kiloDaltons (kDa); (b) an anionic friction reducer; and (c) an aqueous fluid), and in particular when performing a wellbore servicing operation (e.g., fracturing) on a wellbore penetrating a subterranean formation comprising shale (e.g., a shale formation).

Example 1

Hydrocarbon production can be hindered as a result of fluid-induced formation damage caused by shale damage (swelling, sloughing, or fines migrating) or chemical damage (insoluble residue or polymer buildup). The proper selection of completion and stimulation fluid with additives provides the leading approach to mitigate formation damage.

Formation-specific damage mechanisms were determined from formation core, drilled cuttings, and outcrop materials for more than 100 North American resource shale samples. The formation materials were characterized using x-ray diffraction (XRD), cation exchange capacity (CEC), swelling sensitivity time (SST), mechanical stability turbidity (MST), and column flow testing to determine mineralogy, fluid sensitivity, and dominate fluid-induced damage mechanism. Preventing formation damage is predominately achieved with cationic clay stabilization chemicals. The efficacy of numerous chemical additives prepared at the same activity but with varied molecular weights (MWs) from 0.1 to 1,200 kDa was evaluated on ultra-low permeability shale samples based on reducing the swelling, fines generation, and mechanical destabilization tendencies. The same treatment chemicals were evaluated for permanency, compatibility with anionic friction reducer (FR) polymers, and mobility within porous media to determine the ideal North American formation stabilization material.

Fines generation was determined to be the dominant fluid-induced damage mechanism for ultra-low permeability North American hydrocarbon-producing formations. Clay content for these active formations range from 1 to 70 wt %, with an average of 30 wt % and a CEC of 4.5 milliequivalence (meq)/100 g, indicating that most North American formations have moderate fluid instability. Fluid sensitives found an average swelling damage comparable to a 1 wt % smectite sample (30 seconds) mass loss due to mild mechanical agitation similar to an illite sample (3.2 wt %/hr) and fines generation due to flow approximately half of an illite sample (6.22 mg/PV). Prevention of these fluid-induced formation damage effects was determined for cationic clay stabilization chemicals ranging in MWs from monovalent salt solutions to large polymeric materials. Highly mobile monovalent salts effectively prevent swelling and remain compatible in an anionic FR solution; however, these treatments are temporary and less effective for remediating fines generation. Increasing the MW of cationic treatments improves the performance in terms of preventing swelling, fines, and wash-off; however, if the MW increase is too large, the polymers reduce permeability and become incompatible with anionic FR polymers. There is a range of moderate MW cationic clay stabilization chemicals, e.g., having a molecular weight in a range of from equal to or greater than 0.05 to equal to or less than 2.0 kiloDaltons (kDa), alternatively having a molecular weight in a range of from equal to or greater than 0.1 to equal to or less than 1.0 kiloDaltons (kDa), or alternatively having a molecular weight in a range of from equal to or greater than 0.3 to equal to or less than 1.0 kiloDaltons (kDa), that provides permanent protection against swelling and fines damage while remaining compatible with anionic FRs. Additonally or alternatively, cationic clay stabilization chemicals having cationic charge functional groups of greater than 2 to equal to or less than 5 cationic charges per molecule provide permanent protection against swelling and fines damage while remaining compatible with anionic FRs. This range of moderate MW cationic clay stabilization chemicals is the optimal chemical additive for most shale formations, offering the most effective protection against prevalent fluid-induced formation damage mechanisms while preventing chemical damage.

Formation damage can occur at any stage of a well's life and is defined as any process that reduces the propensity for production of oil or gas. Drilling and completion-based damage is commonly referred to when discussing formation damage. These effects are localized and minimized with well-balanced fluid, cleanup steps, and cased-hole designs. Because the drilling and completion damage is minimized and localized, the damaged area does not represent a significant volume of the reservoir, and most of the damaged region can be easily penetrated by perforation or hydraulic fracture. In comparison, stimulation-based formation damage accounts for damage to the fracture surface, fracture pack, and the fluid leak-off zone (which can extend hundreds to thousands of feet, even in low-permeability shale formations). This means that the stimulation damage impacts a large volume of the reservoir, and more technological effort should be spent to understand the damage mechanisms and their impact on production.

Stimulation formation damage considers two primary effects: formation and chemical. Formation (physical) effects are typically swelling, sloughing, or generating fines from contact with a wellbore servicing fluid (e.g., fracturing fluid), while chemical effects are insoluble residue or polymer buildup that results from contact with the chemical components of a wellbore servicing fluid (e.g., fracturing fluid). Formation effects are driven by fluid interactions with the mineral composition of the matrix, including the type, quantity, and reactivity of clay minerals. Chemical responses are impacted by water quality, reactions, and chemical compatibilities with the treatment fluid, in-situ fluid, formation surfaces, and/or pores network. The overall sensitivity of a given formation is a combination of these responses and their potential impact on production which depends on many variables inherent to a given formation and chosen stimulation treatment.

Swelling, sloughing, and fines generation are typically associated with hydration of the clay minerals. For most shale formations, clay damage is synonymous with fluid-induced formation damage because the clay minerals are present in high quantities and are highly reactive with fluids. Clay minerals are phyllosilicates—layered crystals that are less stable to fluid exposure than framework-stabilized tectosilicates (e.g., quartz). Most clay crystal layers are composed of interstitial cations that are mobile, allowing for exchange with other cations and coordination with water molecules that cause expansion and contraction forces that can destabilize the shale formation matrix. Expansion of the clay minerals puts pressure on the surrounding formation matrix, resulting in swelling damage. Additionally, the increased distance between platelets reduces the electrostatic forces that hold the clay minerals together and attaches them within the shale formation. Reduction of electrostatic forces lowers the cohesive strength, making generation of fine particulates more prominent.

Chemical treatments are necessary to help prevent fluid-induced formation damage. Cationic clay stabilization treatments have been used to protect against clay-induced damage in water-based hydraulic fracturing operations, and usage recommendations started with the use of KCl and monovalent salts and evolved into various molecular weight (MW) cationic organic polymers (COPs). Cationic organic polymers (COPs) are typically composed of long-chain organic polymers with MWs in the range of 5 kDa to more than 1,000 kDa. Variations of these chemicals have been developed over time to address various clay- and fines-related production problems, such as fines migration.

Chemical-induced formation damage can result from interactions within the pumped chemicals, the in-situ fluid, and/or the formation (surface, pores, fractures, and propped fracture area). Pretreatment testing of fluid compatibilities looking for formation of precipitates, coacervates, phase separations, and impaired performance in laboratory techniques (e.g., core flow, regained perm, and conductivity testing) are all performed to reduce the risk of chemical damage in stimulation fluid and reservoir material systems.

Most of the cationic clay stabilization treatments were designed for formations with permeability greater than 1 mD, with the primary protection mechanisms of swelling inhibition and fine flocculation. Hydraulic fracturing treatments are currently being applied to formations having permeability in the 1- to 500-nD range, with clays dispersed within the fabric of the silt-sized quartz and carbonate grains. These formations necessitate inhibiting swelling, mechanical, and fines generation. Additionally, 80% of the North American hydraulic fracturing treatment fluids are made with large MW anionic friction reducer (FR) polymers, where chemical incompatibilities are a major concern. This example examines the cationic clay stabilizers for their efficacy on preventing fluid-induced swelling, mechanical destabilization, and fines generation while also accounting for permanency, compatibility with anionic FR polymers, and mobility within porous media to determine ideal cationic treatments for North American ultra-low permeability shales.

North American formation materials were obtained mostly from drilling cuttings sourced from drilling operations following strict protocol to ensure they were from the targeted stimulation zone. Sample collection, cleaning, fractioning, and grinding protocols were developed to maximize the availability of native rock and minimize the impact of drilling fluid and solvent exposure on the fluid sensitivity analysis. Sequential solvent washing and oven drying were performed before large particles were sectioned off to be ground and sieved to specific particle size distributions (PSDs) for testing and characterization.

Mineralogy of the formation material is determined using XRD analysis. An x-ray beam was projected onto finely ground solid formation material, and the resulting pattern was compared to patterns for known minerals for identification. Intensity of the peaks within the pattern dictates the relative abundances of each mineral.

CEC evaluations are one of the most important parameters for determining if a formation is sensitive to aqueous fluid. CEC uses a cationic methylene blue dye to quantify the exchange of free cations on available anionic clay minerals. Each sample of formation material used materials sized finer than 200 mesh. Through a titration-based technique, the amounts of displaceable cations for a given formation sample are measured. Test results are reported as meq, which is calculated by the volume of methylene blue solution (3.2 g/L)/mass of solid formation materials.

To determine the relative swelling tendency of different formation materials, SST tests in freshwater were used. SST refers to specially prepared slurries containing formation materials at a set size, ratio to fluid, and prepared with consistent shear stress and time, which are then run on a capillary suction timer (CST). The CST is susceptible to the modifications within the free water traveling through the solids from the slurry while they create a filter cake into standard porous paper. Two electrodes in contact with the filter paper at 0.5 and 1.0 cm from the edge of the cylinder quantify the time it takes for the free water to wick from the inner radius to the outer radius. The CST is recorded in seconds, and the final reported SST value is the CST of a blank fluid (run without solids) subtracted from the slurry CST. Each slurry CST was measured in triplicate, and the values are averaged.

Figure 1B:
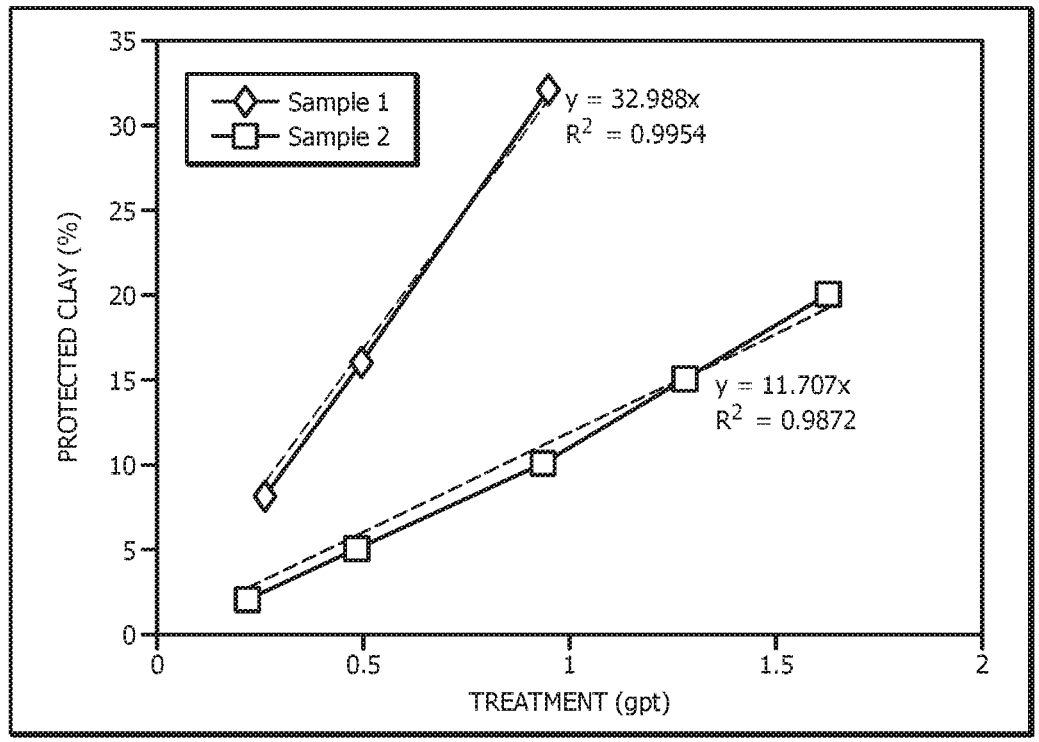
FIG. 1B shows the dosage of treatment additive increases the maximum clay protected linearly.

A technique was developed to evaluate clay protection as a function of a treatment additive type and concentration. Individual SSTs were conducted where the smectite clay concentrations were varied from 0 to 64% clay. For freshwater, the SST increased linearly with clay content (note that different batches of clay provided different slopes, but all batches tested were linearly responsive to clay concentrations, and all treatments were compared on the same batch of clay for consistency). To evaluate chemical efficacy, the treatments are run on all smectite-spiked samples at three or more dosages to determine the maximum clay protected. For example, FIG. 1A shows the plot of the measured SST as a function of clay concentrations. For freshwater, there is a linearly increasing red line that intersects the origin. When 0.25 gal/1,000 gal (gpt) of clay stabilizer is added, the SST shifts from an intersection with the origin, because SST time does not increase until clay concentration exceeds the maximum clay protected at that concentration. By determining where the linearly increasing region intersects the full-protected region, the maximum protected clay can be determined. The dosage of treatment additive increases the maximum clay protected linearly (FIG. 1B). Through regression analysis, now treatments can be evaluated based on their capacity to protect a sample with a given percentage of smectite clay.

The MST test measures the release of formation material due to mechanical destabilization within a fluid. Ground formation materials were subjected to freshwater or treatment fluid and mechanical agitation. During a short period of time, the propensity of the sample to disintegrate and release suspended fine materials is determined by measuring the turbidity of the solution. More fines in suspension are an indication that the fluid wetting and mechanical agitation process resulted in an increase in the rate of formation destabilization. The turbidity of the fluid is monitored as a function of aggregation time and treatment—the treatment that generates the lowest turbidity is indicative of the optimum formation stabilization treatment.

Figure 2:
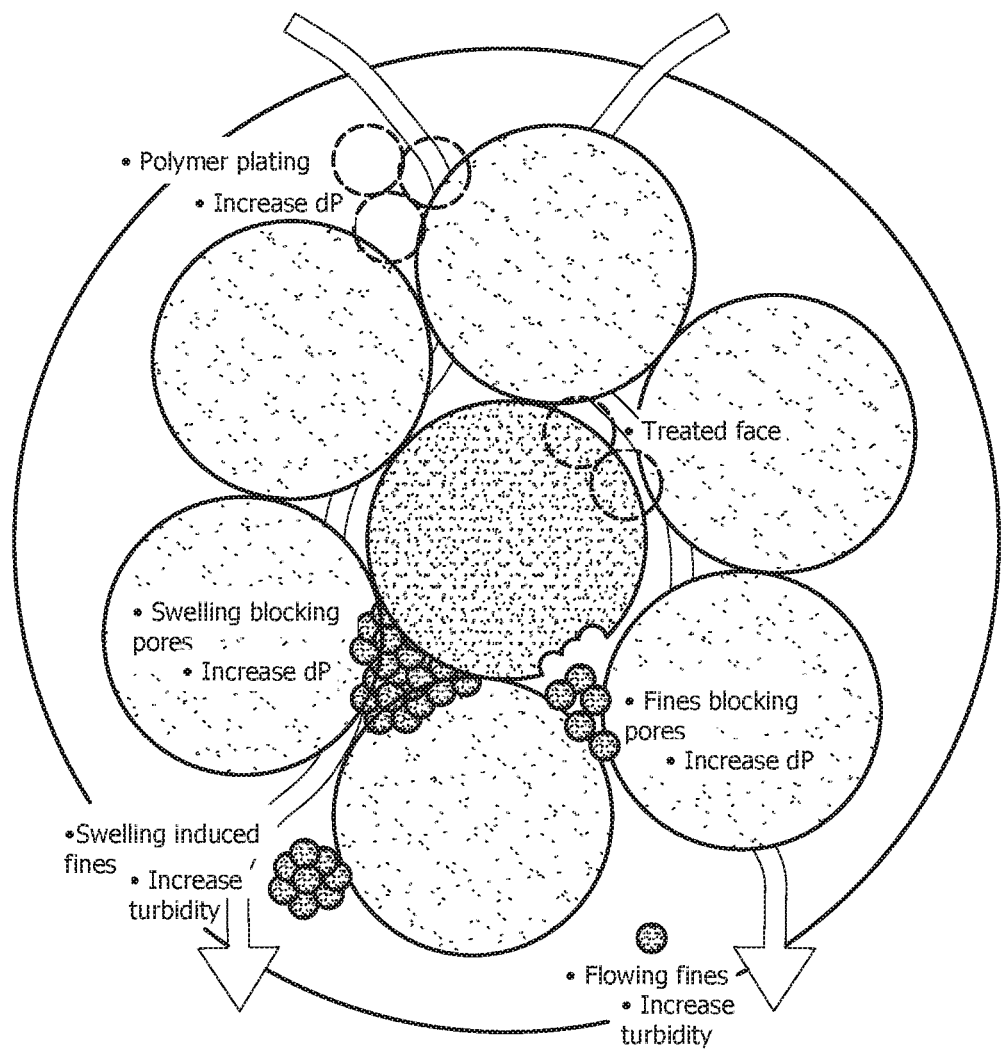
FIG. 2 shows the treatment efficacy within sandpack columns use differential pressure to measure permeability changes and evaluate the eluted fluid to determine fines migration.

Sandpack column flow tests were designed to quantitatively determine the fluid-induced damage because of swelling and/or fines generation of formation materials and polymer jamming, treatment efficiencies, and permanence for clay stabilizers. All tests were run using 1-in. inner diameter, Teflon-lined, torqued sandpack cells loaded with compressed sand mixtures composed of 100- and <325-mesh silica sand at different ratios to control permeability. Formation cuttings (100 mesh) or illite clay (100 mesh) were spiked at 10% while smectite clay (<325 mesh) was spiked at 2%. Each sandpack was held in place with 120-mesh stainless steel wire screens to control the movement of the large particles while allowing the fines to pass freely. FIG. 2 depicts the postulated and anticipated effects from swelling, fines, and treatments. Pressure transducers were installed at the inlet and outlet of the tubing assembly to measure the pressure drop across the column and to calculate the pack permeability. Effluent was collected for each pore volume (PV) to measure the release of fines and changes to the fluid composition.

Treatment efficacy for swelling was determined using regain permeability that consisted of first flowing an 8 PV, 5% standard KCl brine solution through the sandpack to obtain the initial permeability. Next, the test fluid is flowed through the sandpack in the opposite direction for 5 PV, followed by a 3 PV, 5% KCl flush and then a 3 PV freshwater challenge, all at 6 mL/min. The standard brine is retested in the original flow direction to determine final permeability. The percentage of the treatment permeability relative to initial permeability is related to the polymer jamming, and final permeability to the initial permeability is the regained permeability. For the evaluation of permanency, an additional step of flowing freshwater through the sandpack for up to 380 minutes was performed to investigate the rate of permeability change within freshwater to determine treatment permanency.

Flow-induced fines generation was evaluated with three PVs of 7% KCl at five flow rates from 5 to 25 mL/min and then with the same volume and flow rates of the treatment fluid. Then the treatment fluid was displaced by a steady flow of freshwater until the ionic conductivity of the eluent was minimized. Finally, the lasting effects on protection against fines generation after treatment was tested with 400 PV of a freshwater challenge with flow rates from 5 to 25 back to 5 mL/min to evaluate flow rate and time-dependent effects on fines generation.

Permeability of a treatment can be expressed with the following equation:

$$\text{Treatment Perm} = 100\% \; [1 - f_{rpf}(\text{molecular size}, \text{pore size})] \quad [1]$$

where $f_{rpf}$ is the reduction in pore flow. Model development began with a conceptual expression often used to help predict the jamming of solid particles suspended within a fluid and passing through apertures with a net reduced cross-sectional area. Taking this approach yielded the following expression:

$$f_{rpf} = A e^{-B\delta} \quad [2]$$

A practical model was developed that accurately considers the impact of molecular size on treatment permeability modifications in each formation as a function of the increased MW for cationic clay stabilization treatments. For Equation [2], factors A and B are parameters for a given type of particle shape and size, concentration of particles, transport regime (laminar vs. transitional vs. turbulent), size of reduced flow path, densities of fluid and particles, etc. For the simple case of a dilute concentration of spherical particles suspended within Newtonian fluid (both of approximately the same density) flowing into a net reduced cross-sectional flow path of diameter D, δ becomes:

$$\delta = \left(\frac{D}{D_p}\right)^2 - 1 \quad [3]$$

where $D_p$ is the diameter of the spherical particles. Adapting these conceptual models to this study resulted in the following modifications:

$$\delta = \left(\frac{D_{pt}}{L_m}\right)^\sigma - 1 \quad [4]$$

where $L_m$ is the theoretical length of a polymer molecule, $D_{pt}$ is the pore throat size, and σ is a characteristic function of the polymer MW, size, and shape relative to the size of the pore throat. For this study, the following function was developed for σ:

$$\sigma = A_\sigma \left(\frac{L_m}{D_{pt}}\right)^{B_\sigma} \quad [5]$$

where $A_\sigma$ relates to the tendency of the polymer molecules to flocculate or adhere to the pore surface, and $B_\sigma$ relates to the geometry of the molecule as it flows through the pore throat tortuousness.

All clay stabilizers were analytically characterized for pH (using a Mettler Toledo® pH probe), conductivity (using a Mettler Toledo conductivity probe), and viscosity (using rotating disc Anton-Paar rheometer). The MWs of the clay stabilizers were determined by two variations of laser light scattering (MALLS), resulting in both variations being quite comparable. MW calculations used a dn/dc of 0.180 mL/g. Dextran (40K) was used to normalize the MALLS detector. The samples were diluted to between 0.1 and 10 mg/mL during the filtered mobile phase based on estimations of MW. The first variation used conventional gel permeation chromatography (GPC) using a Shodex OHpak SB-804 HQ column with a mobile phase consisting of 100-mM sodium nitrate with 500-mM acetic acid at a flow rate of 0.5 mL/min. The mobile phase was filtered to 0.02 microns before use. The system used a Wyatt Helios-II MALLS detector with a QELS option for dynamic light scattering and a Wyatt WTREX refractive index (RI) detector.

The second variation used concentration gradient multi-angle light scattering (CG-MALS); a Wyatt Calypso II was used in conjunction with the same detectors used during the GPC experiments. CG-MALS has several advantages compared to conventional GPC. It uses lower concentrations than what is injected with GPC, helping ensure that the polymer molecules are not aggregated, which helps improve recovery and accuracy of the results. These results are achieved much more quickly with significantly less mobile phase use. This type of analysis is a variation of a batch mode analysis, which measures the MW of the sample as a whole but not the polydispersity. The effect of KCl on the hydrodynamic radius was studied using the CG-MALS system. Each polymer studied was diluted in water to approximately twice the concentration typically used for analysis. A KCl solution was prepared at 14% w/w and filtered to 0.02 microns. The resulting polymer concentrations were half of the prepared sample and had 0 to 7% w/w KCl in 10% increments.

Fluid compatibility for each cationic clay stabilizer and an anionic FR was measured using bottle tests, observing for indications of a coacervate or precipitate formation. Bottle tests were run on 100-mL samples at equal concentrations of clay stabilizer and FR at 5 gal/1,000 gal and then with the FRs at 1 gal/1,000 gal with clay stabilizers at 2 gal/1,000 gal. Each sample is mixed by hand for 30 seconds and allowed to sit for up to 15 minutes to visually determine compatibility between fluids.

Figure 3:
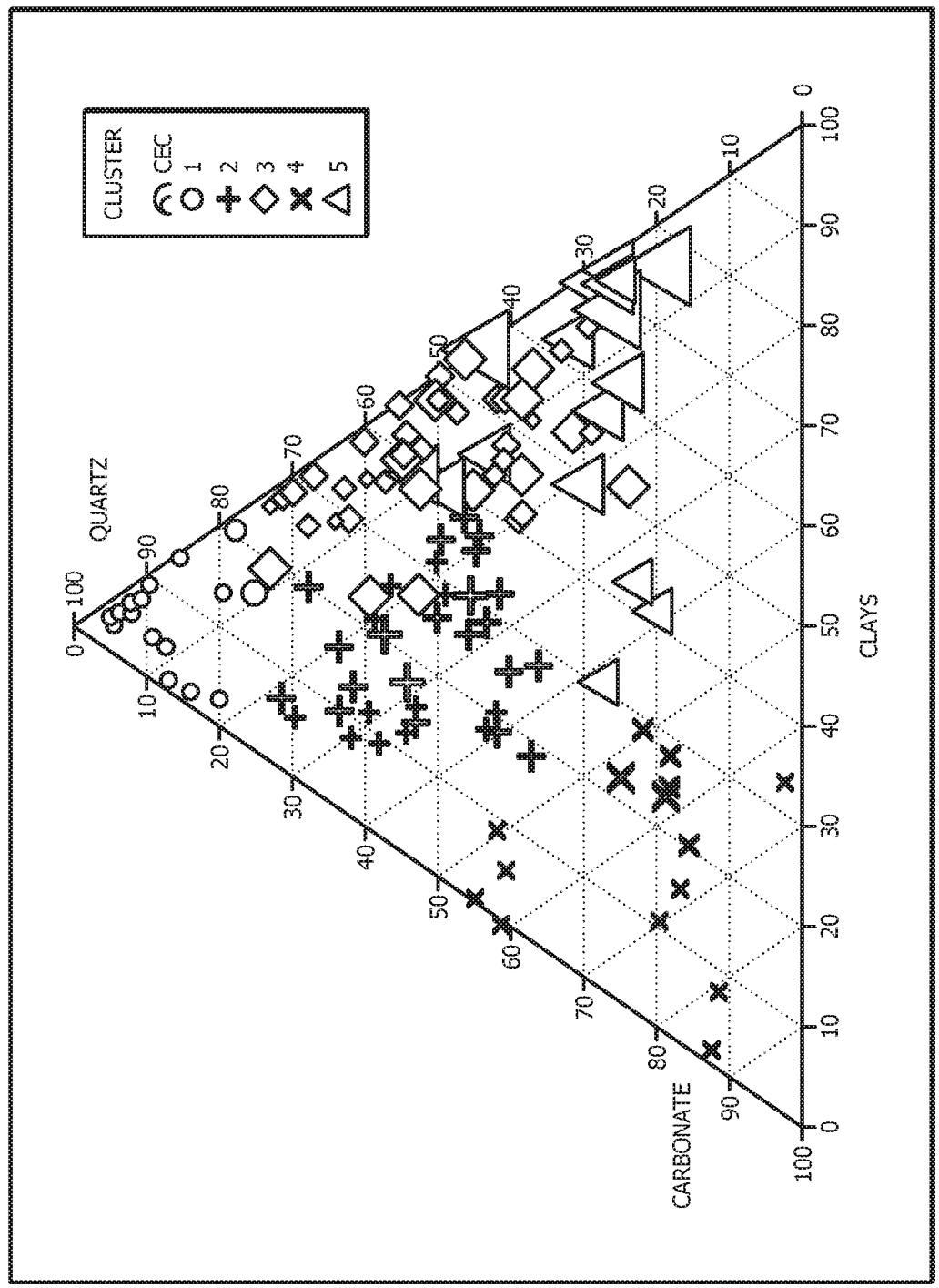
FIG. 3 shows the mineralogy distribution for North American formation materials sized by CEC and colored by cluster.

The ideal North American cationic clay stabilizer would permanently prevent fluid-induced swelling, sloughing, and fines generation while also remaining mobile within porous media and compatible with anionic FR polymers. To determine the most effective treatment, an evaluation was performed on formation materials comprising 135 cuttings samples obtained from 44 North American formations. FIG. 3 shows the mineralogy determined from XRD for these formation materials. Clay content ranged from 2 to 70 wt % with an average of 30 wt %, and the reactivity of these materials ranged in CEC from 0 to 30 meq/100 g with an average of 4.5 meq/100 g, indicating low to moderate reactivity for these formation materials. CEC tends to increase with clay concentrations; however, either because of inconsistencies of identifying the clay type via XRD or because of contributing effects of the matrix on the CEC, the correlation between the two metrics is weak. Cluster analysis based on the relative abundance of quartz, carbonate, clay, and their determined reactivity based on the CEC yields five distinct clusters that are classified by the principal component analysis: cluster (1) quartz rich, cluster (2) mixed mineralogy/low CEC, cluster (3) quartz-clay rich/moderate CEC, cluster (4) carbonate rich, and cluster (5) clay rich/high CEC.

These formation samples were collected with the intended purpose of representing as many active hydraulically fractured North American formations as possible. All samples were obtained from cuttings collected during drilling of the lateral section of horizontal wells. However, not every North American formation is represented, and many formations had more than one sample analyzed. One major area outside the scope of this paper is true identification of the designated formation. Formation names were provided for each sample; however, the specific formation name typically did not match the formation classification determined from publicly available information or geological earth models, and therefore the formation designation is omitted from this example. Table 1 shows regional information where the number of samples and number of formations tested are provided. Additionally, Table 1 provides the breakdown of the count of samples obtained from each region by cluster. Some of the clusters, such as Cluster 1-quartz rich formations, were predominately populated by one region (81% from Canada), while the most populated, Cluster 3-clay rich/moderate CEC, had at least one sample per region.

Fluid sensitivity of the formations was determined individually using SST and MST, while fines generation was determined from representative samples from each cluster using sandpack column flow tests. SST tests demonstrated a range of reactivity from 3.9 to 389.4 seconds with an average of 32.4 seconds (comparable to a 1.1 wt % pure smectite spiked sample). The mechanical stability of these formations in freshwater range from 0.2 to 15.5 wt %/hour mass loss to fines. The average mass loss based on MST was 3.4 wt %/hr. For comparison, MST on illite averages a mass loss to fines of 3.2±0.5 wt %/hr, smectite 13.4±0.9 wt %/hr and a mixed-layer clay rich shale 21.1 wt %/hr. Of the 135 samples, 39% lost more mass per hour than illite, and 8% lost more mass per hour than a smectite sample. Illite and representative samples from each cluster exhibited fines generation in freshwater from 0.1 to 13.6 mg/PV, with an average rate of 6.22 mg/PV at all flow rates. Illite had the greatest amount of fines generation at 14.5 mg/PV.

Figure 4:
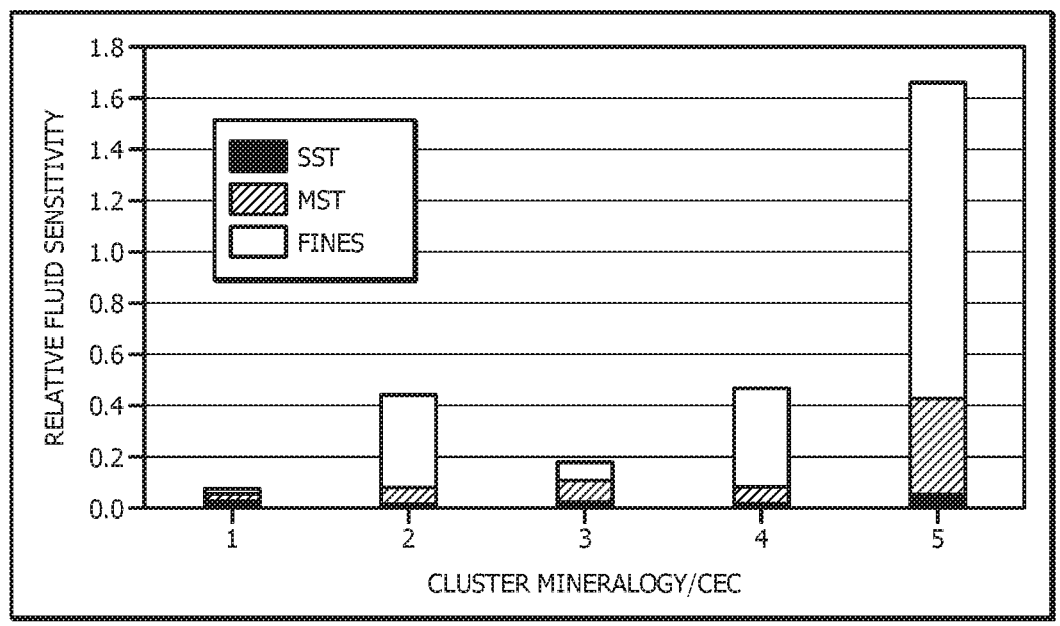
FIG. 4 shows the formation fluid sensitivity for each mineralogy cluster relative to clay standards (smectite: swelling; mixed layer: mechanical; illite: fines generation).

Fluid sensitivity normalized relative to the clay samples (smectite for swelling, mixed layer shale for mechanical, and illite for fines damage) was used to determine the overall sensitivity and the most prevalent damage mechanism for each cluster (FIG. 4). The height of the bar represents the cluster's measured damage relative to the clay samples—a value of 1 would be the same damage as clay, and an overall relative fluid sensitivity of 3 would be achieved if the formation experienced the same damage as the clay samples in every category. As expected from their clay content and median CEC values, Cluster 1 has the lowest relative fluid sensitivity (2% of the clay samples) and Cluster 5 has the highest (55%), exceeding the damage of the clay standards in some categories. Clusters 2 and 4 have similar fluid sensitivities and damage mechanisms, which are mostly due to fines generation. Cluster 1 is more likely to have swelling than mechanical or fines generation but to a very low extent. Cluster 3 has low to moderate sensitivity and almost equal potential for mechanical damage and fines generation. Cluster 5 was the most fluid sensitive and had the most significant probability for fine generation but also has increased probability for swelling and fines compared to the other four clusters. Choosing the right formation stabilizer means finding a treatment that provides long-lasting protection against swelling, fines generation, and mechanical damage—or applying the right treatment for the most prevalent damage mechanism in a given formation.

Determining the most effective cationic clay stabilizer for each damage mechanism was performed by screening a range of sizes: ionic salt solutions to oligomers to polymers. After cationic charge, the MW has the most significant effect on the reducing fluid-induced damage to the formation. To determine the most effective cationic treatment, moieties from monovalent salts, such as KCl and NaCl, were compared to oligomers having two or more cationic charge residues with MW between 0.15 and 2.0 kiloDaltons (kDa) and COPs from 2.0 to 1,500.0 kDa. The efficacy of these materials was evaluated with respect to their ability to improve swelling, mechanical damage, fines generation, permanency, anionic polymer compatibility, and mobility within porous media.

Cationic clay stabilizers treat swelling clays via two mechanisms: decreased osmotic potential and lowered crystalline displacement. When comparing treatments beyond their effective CEC, their differences can be determined

TABLE 1

Sample mineralogy and classification per geographical region.

Figure 5:
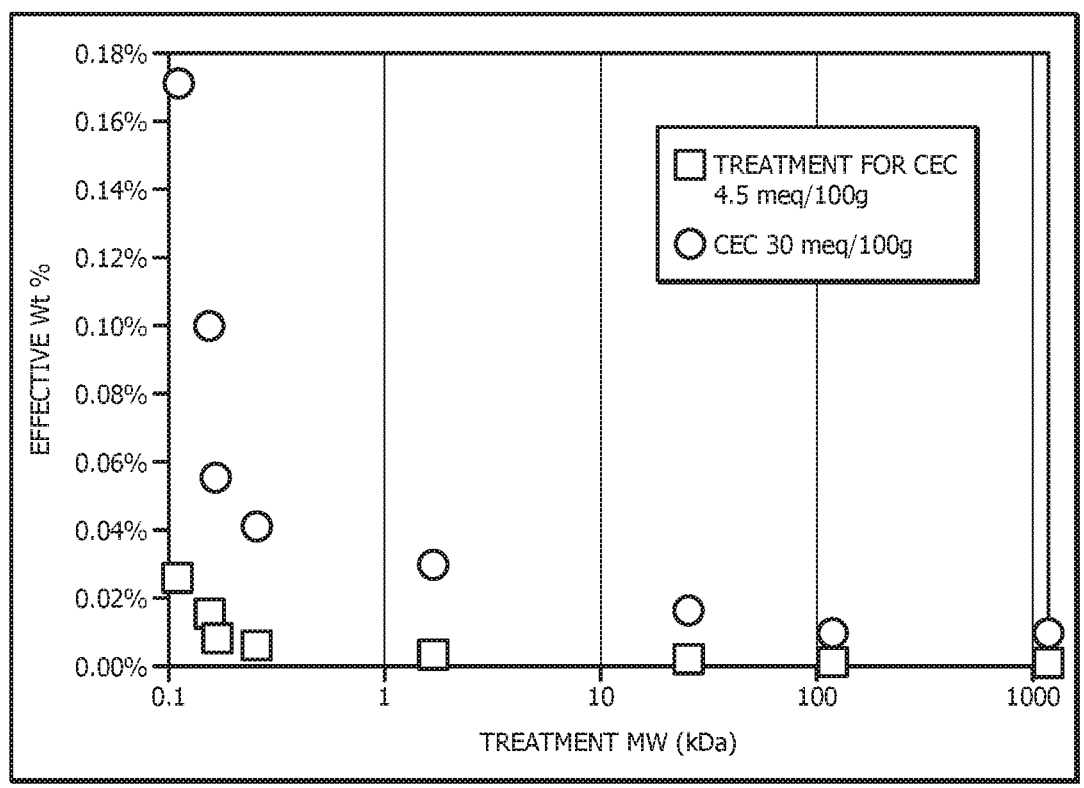
FIG. 5 shows the MW effect on swelling protection for two reactive CEC levels: 4.5 meq/100 g (North American formation average CEC) and 30 meq/100 g (highest North American formation CEC).
Figure 6:
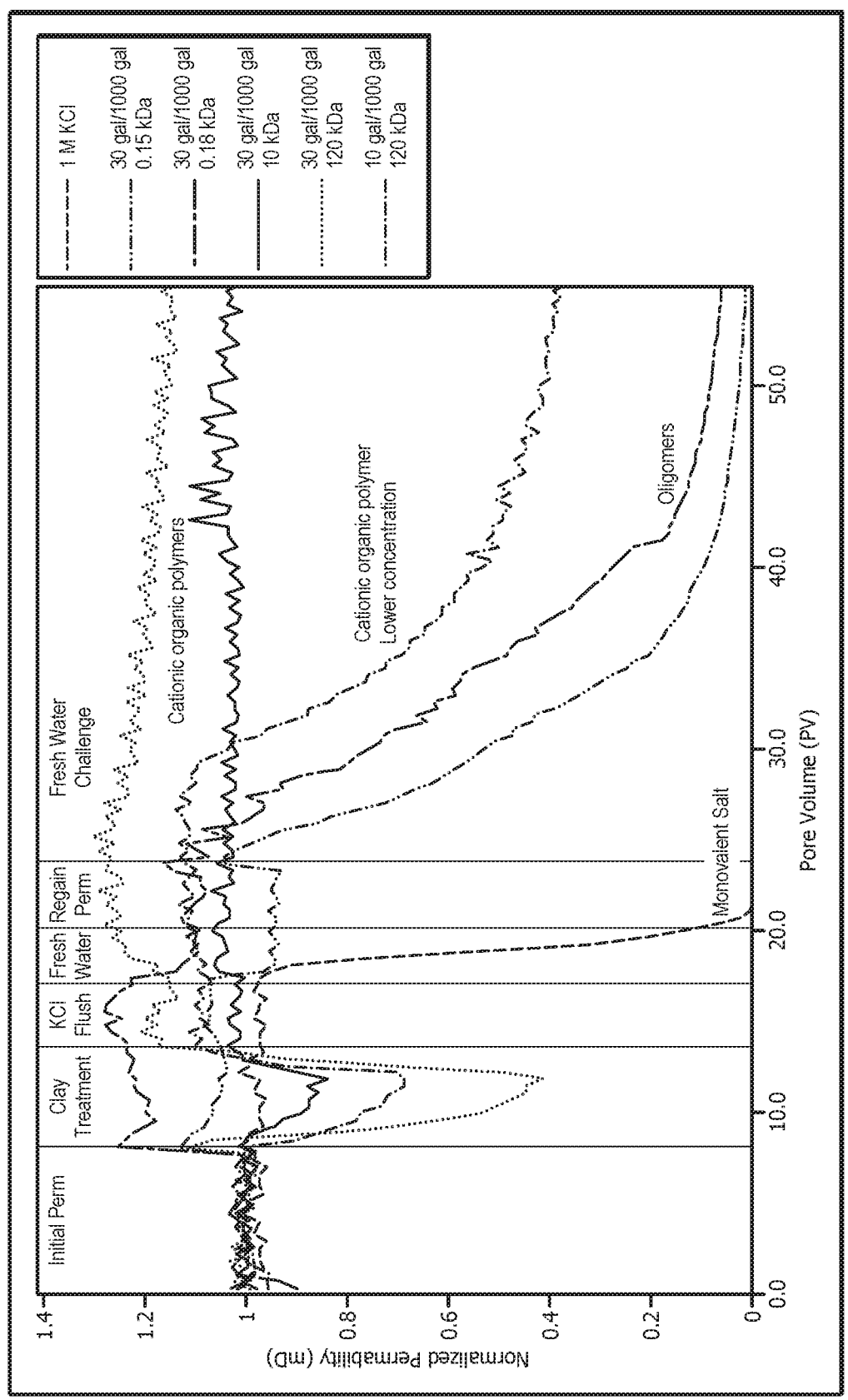
FIG. 6 shows sandpack regains permeability for treatment of swelling clays during flow.

| North American Region | Total No. Samples | Total No. Formations | Cluster 1 Quartz Rich | Cluster 2 Mixed Mineralogy/Low CEC | Cluster 3 Clay Rich/Moderate CEC | Cluster 4 Carbonate Rich | Cluster 5 Clay Rich/High CEC |
|---|---|---|---|---|---|---|---|
| Permian | 16 | 4 | 0 | 11 | 5 | 0 | 0 |
| Rockies | 17 | 7 | 1 | 0 | 7 | 3 | 6 |
| Northeast | 17 | 3 | 0 | 0 | 14 | 3 | 0 |
| MidConn | 41 | 9 | 2 | 15 | 17 | 3 | 4 |
| Southeast | 12 | 5 | 0 | 1 | 2 | 6 | 3 |
| Canada | 23 | 14 | 13 | 7 | 1 | 2 | 0 |
| Gulf of Mexico | 8 | 2 | 0 | 0 | 2 | 0 | 6 | using the basal lattice separations determined from XRD. Most inorganic salts have been well characterized in previous literature. Here, treatment effects for cationic organic oligomers and polymers are compared to determine necessary dosages to achieve full protection of the swelling potential for North American shales. Increasing concentrations of clay were tested at two to three low dosages to determine the maximum percentage of clay protectable at each concentration. The results could then be extrapolated to the CEC of that clay loading, and through linear regression determine the dosage necessary to treat various CECs, particularly 4.5 meq/100 g, which is the North American average, and 30 meq/100 g, which was the maximum measured CEC for a formation. FIG. 5 shows the effective wt % of full protection vs. MW for various clay stabilizers. The dosage necessary to protect a 4.5 CEC swelling formation material would be highest for low MW oligomers (0.03 wt %) and decreasing exponentially, requiring only 0.002 wt % of a one-million MW polymer. To remedy the swelling for the highest measured CEC (30 meq/100 g), the oligomer would be run at 0.17 wt %, and equal protection with the high MW polymers is achieved at 0.01 wt %.

Dosage of the effective cationic organic clay stabilization treatment for swelling clay protection would depend on the activity of the stock solution. For example, if all activities were equal to 45 wt % (which is the average activity for all treatments evaluated), the dosage necessary to protect a CEC of 4.5 meq/100 g would be 0.04 to 0.57 gal/1,000 gal, and a CEC of 30 meq/100 g would be 0.25 to 3.8 gal/1,000 gal. For most formations, treating with even a minor amount of clay stabilizer will help protect against the swelling potential; more treatment is necessary with the smaller cationic oligomers because they have less cations per molecule, and they treat fewer CEC/cation. All fluid contacting the reservoir should be at the effective dosage to help prevent damage to exposed formation surfaces. If the formation is not fully protected with a permanent stabilizer, then modifications with the fluid composition could result in fluid-induced formation damage.

Regained permeability tests were designed to quantitatively determine efficacy of treating fluid-induced swelling damage during fluid flow. To determine these effects for cationic clay stabilizers, consolidated sandpacks containing 2% smectite clay were prepared at 1,500 or 200 milliDarcy (mD). The testing sequence includes first determining the initial permeability using a brine fluid, then a volume of clay stabilizer treatment fluid, a volume of freshwater, and finally the brine fluid. The comparison between the sandpack permeability to brine before and after being exposed to treatment and freshwater indicates whether the clay stabilizer provides protection against swelling. After swelling protection testing, the sandpack was flushed with excess freshwater to determine if the treatment effects were permanent and long lasting.

The first set of tests was run at an excess treatment necessary to stabilize the 2% smectite clay containing sandpacks: 1 M of the monovalent salt and 30 gal/1,000 gal of the oligomers and polymers. Excess treatments were tested to determine if the fully protected clays are resistant to fluid exchange damage. Monovalent salt solutions work for protecting clay as long as they are in a solution at adequate concentrations. From the regain permeability, it is shown that the sandpack permeability remains constant until contacted with freshwater. The permeability was reduced 50% by 1 PV, and 3 PV of freshwater reduced the permeability by 99%. Oligomers are more resistant to exchange with freshwater, and the 3-PV challenge had very little effect; the average regain permeability was 99%. However, the oligomers were not fully resistant to wash off; the 0.15 and 0.18 kDa MW oligomers had a 50% reduction in permeability by 7 and 11 PV of freshwater, respectively. Additionally, polymers of 10 and 120 kDa MW retained the original permeability of the sandpack, and they were extremely resistant to washing off—each was able to maintain greater than 90% permeability after 100 PV of the freshwater challenge. The higher MW polymers exhibited a measured decrease in permeability during treatment. Some of the decrease could be due to the higher viscosity for the treatment fluid, but even with viscosity corrections to the permeability calculation, the decrease in permeability was more significant for polymers and increased with MW.

The permanent, high MW treatment has a different effect when run at 10 gal/1,000 gal. The regained permeability is still 100%, the treatment permeability reduction is less, but the freshwater challenge only exhibits protection against permeability loss for 8 PV, when permeability loss begins, appearing to suggest the treatment is temporary. However, the permeability never goes below 40% of the initial permeability. These results suggest that 10 gal/1,000 gal of high MW treatment did not sufficiently treat the entire 2% clay sandpack, leaving the untreated clay particles to swell during the final freshwater challenge. SST testing demonstrated that the high MW polymer (120 kDa) should be able protect 1 wt % of the swelling smectite clay column per 1 gal/1,000 gal, which would allow for full protection of a 10% clay sandpack at 10 gal/1,000 gal—five times more clay than is present within the current setup. The lack of treatment could be because of either that the resonance time under flow is less than in the SST testing, which would inhibit the polymer's ability to bind to the clay surface, or the polymer could not contact all of the clay surfaces in a packed column because of channeling, plating, or blocked pore throats.

Figure 7A:
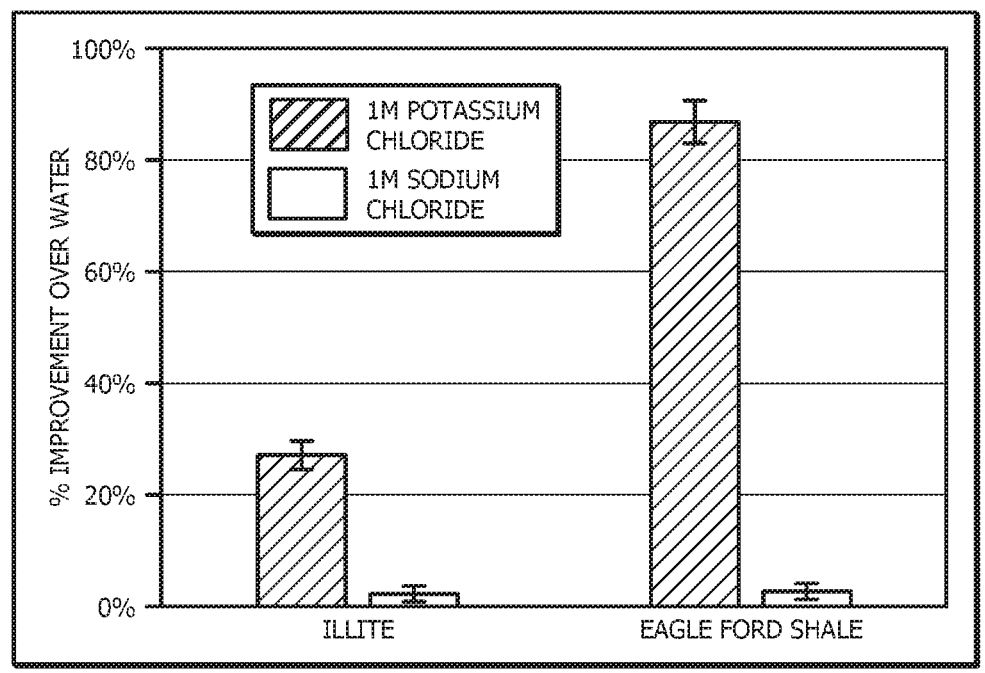
FIGS. 7A and 7B show the protection of mechanical stability of illite and Eagle Ford shale for inorganic salts (FIG. 7A) and cationic organic clay stabilizers at increasing MWs (FIG. 7B).
Figure 7B:
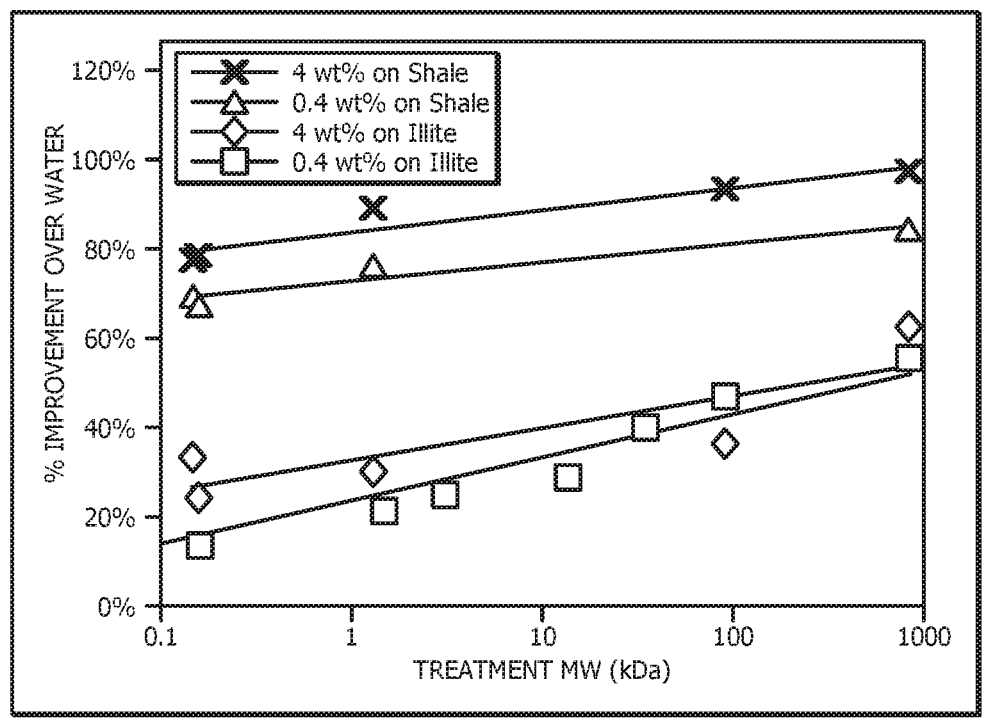

Mechanical damage was measured on illite and a mixed-layer clay containing Eagle Ford shale sample using the MST test with freshwater and cationic clay stabilizers. Illite has an average CEC of 10 meq/100 g and an average mass loss on MST of 3.2±0.5 wt %/hr; Eagle Ford shale has a CEC of 13 meq/100 g and an average mass loss on MST of 21.1±1.2 wt %/hr within freshwater. FIGS. 7A and 7B show that treatment effects were measured at an effective dosage at 1 M for inorganic salts and between 0.04 to 4.0 wt % for cationic organic stabilizers. Inorganic salts at 1 M concentration perform differently on mechanical stability; KCl protected the illite 27%, and Eagle Ford 87% over freshwater, while NaCl had an average improvement of 2% and 3%, respectively (FIG. 7A). For cationic organic clay stabilizers, the treatment efficacy only increased slightly with increasing MW. Additionally, the mechanical stability does not continue to improve to full protection with increased dosage concentrations. Illite clay particles improved to 62% and Eagle Ford shale sample to 97% with high MW polymers at the highest treatment, which were more effective than the inorganic salts. Compared to the MW effects for swelling treatment, the improved mechanical stability at 1,000 kDa is moderate, on average 28% more effective than the 0.1 kDa oligomer. Performance of KCl on the mechanical stabilization of illite and Eagle Ford was within 8% of the highest MW polymer; however, this is not an effective treatment because ionic salts are highly exchangeable with other ions in a solution, and as observed with the 1 M NaCl, other ions are much less effective at protection against mechanical damage.

Figure 8A:
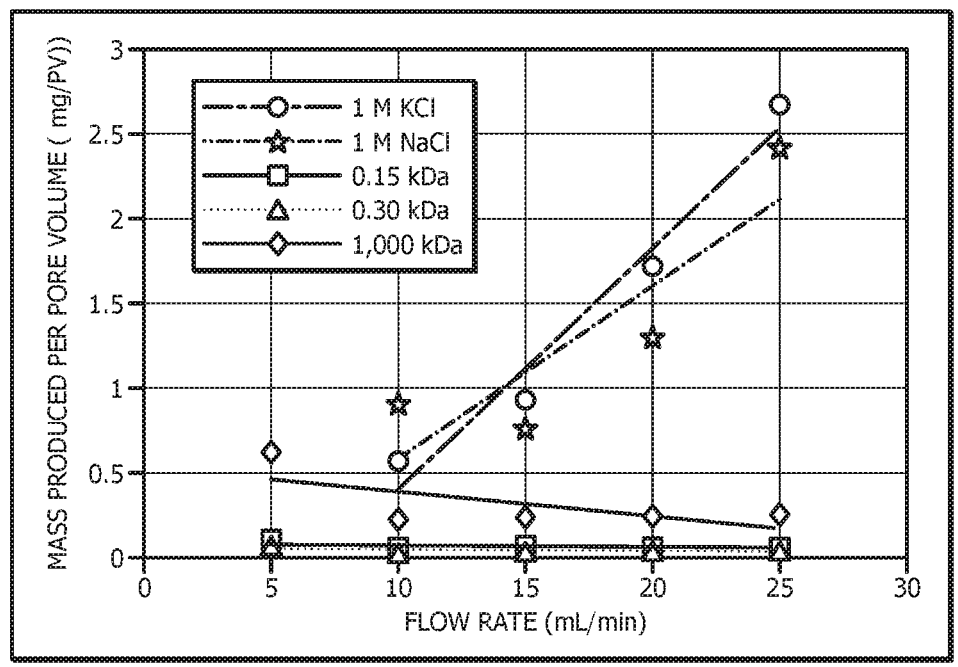
FIGS. 8A and 8B show the treatment of flow-induced fines generation with cationic inorganic and organic stabilizers during a treatment phase (FIG. 8A) and a freshwater challenge (FIG. 8B).

Cationic clay stabilizers are designed to prevent fines migration. This is typically determined by the mobility of fine particulates through a porous media column where flocculation of the fines reduces the mobility of the particles and the amount that migrate or pass freely through a column. This effect does not determine the treatment's ability to prevent more fines from being generated from the surface of the formation. To this end, 10% illite-containing columns were measured at increasing flow rates to determine the induced fines generation during treatment and after exchanging the treatment fluid with freshwater. Ionic salt treatments, 1-Molar KCl (7%) and NaCl (6%), could not stop the flow-rate induced fines generation from illite; the mass of fines produced per PV increased 0.15 mg/PV for every mL/min of increased flow rate (FIG. 8A). Both oligomers tested at 10 gal/10,000 gal were effective at preventing the flow rate-induced fines generation at all flow rates tested. Interestingly, the high MW polymer tested at 10 gal/1,000 gal produced more fines during treatment than the oligomers, but the amount of fines did not increase with flow rate—they decreased with time. Fines production with the high MW polymer is believed to be due to the hindered mobility of the polymer through the sandpack. The higher MW polymer is not as mobile as the oligomers and takes longer to reach all of the clay faces. Once the polymer reaches the surface of the clay, it can help prevent fines generation; however, during the treatment phase, the leading-edge of the fluid is devoid of treatments; therefore, fines are produced until effective treatment is reached.

Figure 8B:
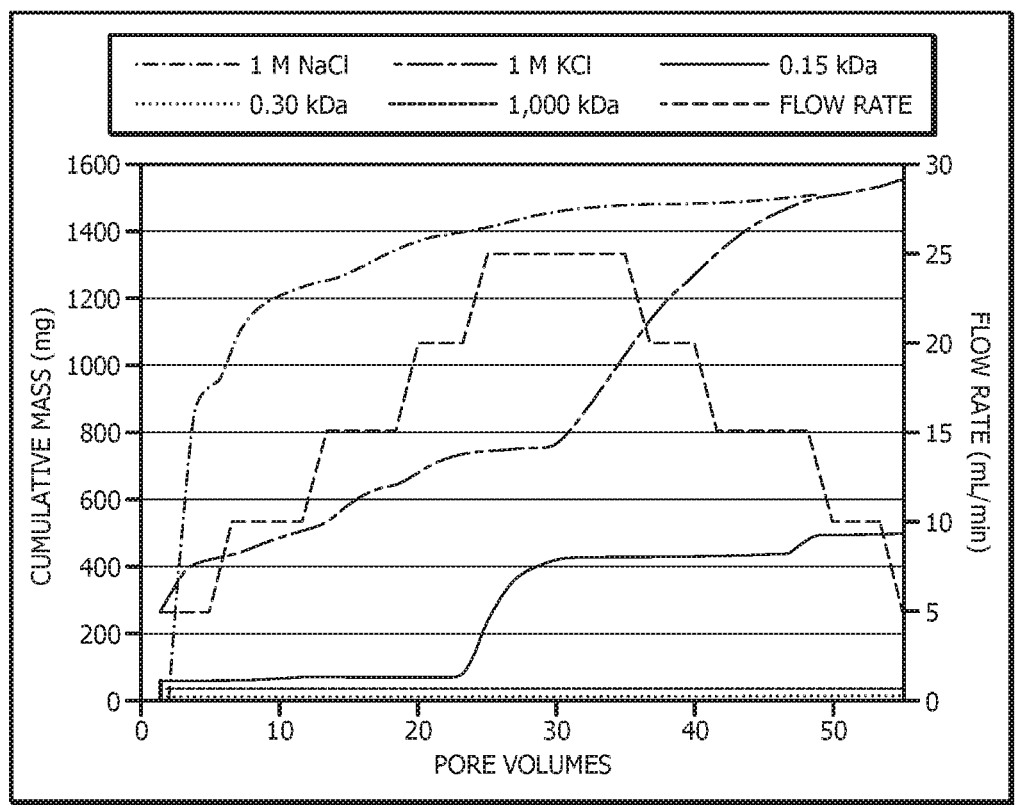

Effective treatments would continue to protect against fines generation and be resistant to exchange with other ions or freshwater to provide formation stability during flow back and production. Ionic salts were readily exchanged with freshwater and produced a significant amount of fines within 1 PV of a freshwater challenge (FIG. 8B). The KCl-treated illite was more resistant to wash off than NaCl; however, both were more than three times more damaging in freshwater than the smallest oligomer. For the oligomer treatments, the lower MW oligomer provided protection against fines until high flow rates 25 mL/min, and then the illite started to produce. Fines production went back down while the flow rate was decreased, indicating that this was a flow rate-induced fines generation for the oligomer-treated illite columns. However, the slightly larger 0.3 kDa oligomer resembled the high MW polymer and remained permanent against wash-off and controlled fines generation even at high flow rates.

Chemical incompatibilities of pumped fluid are avoided as much as possible; however, when using cationic clay stabilizers within the typical anionic FR fluid, there is a likelihood of precipitate or coacervate formation because of chemical incompatibilities. During recent years, the number of operations that report running anionic FRs in FracFocus© has grown to more than 80% of the wells. Within anionic FR fluid, the choice of chemical additive is critical. Incompatibilities will form large insoluble masses that pull the FR and the incompatible chemical out of solution, causing friction pressure and when the additive is clay control, it will leave the formation unprotected.

The compatibility of a cationic clay stabilizer with an anionic FR depends on the MW ratio and charge shielding. Salts and oligomers up to 1 kDa remained compatible within an anionic polymer solution—the small molecules do not bind strongly to the polymer and can attach and detach from the polymer quickly, remaining highly mobile and compatible with the large anionic polymers. When the MW of the cationic clay stabilizer is increased more than 1 kDa, the mixtures can appear to be compatible when there are salt, surfactant, or other charged polymers to shield some of electrostatic forces and break up the coacervates. These stabilization processes are sensitive to the concentrations and environment of the polymers and could appear to be compatible within a laboratory setting but fail to work within the more complex environments, such as the wellbore. Ensuring the compatibility of the base polymers is the best way to help elevate compatibility issues. High MW cationic polymers form tight coacervates and remove the necessary FR and clay stabilizer from the solution. Compatibility with large polymer is not concentration dependent, even at low concentrations the mixture of a high molecular weight polymer with a large anionic friction reducer polymer can be causing formation of insoluble and functioning residue, it just is not always plainly visible.

Metrics to assess fluid-induced damage impacts on production for high permeability oil-producing formations should not be the same as those that impact a tight shale unconventional formation; alterations to grain size and radii of the matrix pore, microfractures, and propped fracture paths alter the rock matrix response to fluid. Cationic clay stabilizers have been extremely successful within the areas of fines control, sand control, acidizing, and fracturing applications. However, the size of these molecules has restricted their use to low concentrations in low permeability formations to prevent plugging of the smaller pore throats. Commonly used cationic polymers within the industry have a MW averaging approximately 500 kDa and a calculated average length of 1.1 micron. Within SPE paper 18881, laboratory flow studies conducted in a 30-mD Wilcox sandstone demonstrated that plugging and permeability reduction occur when a 0.1% weight active solution of a 500 kDa COP in 2% $NH_4Cl$ is injected into the core. The damage to permeability is even more evident when the core matrix is 10 mD with a measured mean pore size less than 3 to 5 microns (Himes et al., 1989). Theoretically, many of the current COPs would be small enough to pass through most of the pores within a formation, and reduction in permeability is in part a reflection of one or more physicochemical phenomena. While the polymers travel through the tortuous pores within the sandpack or formation, they will tend to: physically jam with each other; flocculate as a result of charges or the molecular entanglement phenomena; and adhere or attach to the surface of the rock (sand particles).

Figure 9:
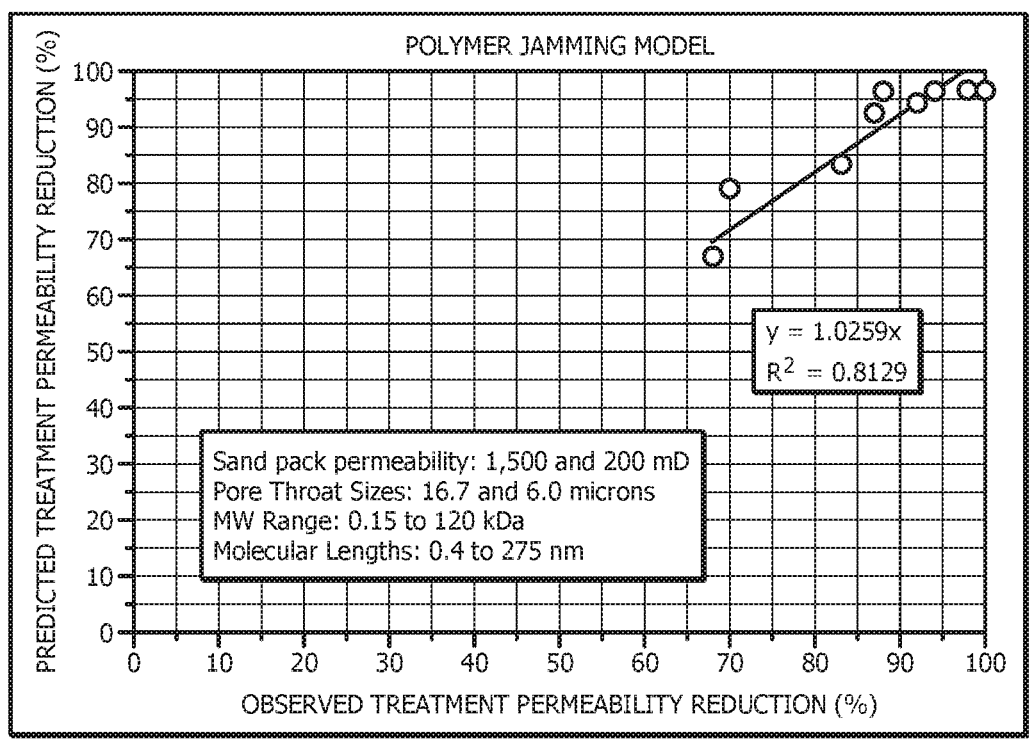
FIG. 9 shows the effectiveness of the physicochemical jamming model to predict treatment permeability.

Reducing the permeability of a well during stimulation treatment would be a fluid-induced damage mechanism with the potential to decrease formation production rates for a given well. Conventional knowledge has demonstrated that polymer jamming reduces the permeability at diameters one-sixth the pore throat and can block permeability at one-half the diameter. Permeability reductions were measured during the treatment stage of the sandpack regain permeability test; columns were prepared at 1,500 and 200 mD. At these permeabilities, the average pore throat should be 17 and 6 microns, respectively, which would require polymers larger than 1,000 nm to reduce the permeability according to the jamming model. Hydrodynamic diameters determined from light scattering techniques demonstrate that the radii for the cationic polymers increase with MW from 1 to 10 nm. The theoretical lengths of the polymers were determined using the equilibrium extension of a cationic polymer reported to be 3.713 nm for every 10 monomer units for a theoretical length range of 0.75 nm for oligomers and 6 to 275 nm for the polymers. Therefore, these sizes are five times smaller than the size that should be causing the jamming in the sand pack coreflow tests. The measured reductions could be effects of polymer plating on the surface to change the effective pore throat or polymer changes due to agglomerating, flocculating, or brine effects on the conformation. A practical model was developed that helps accurately predict the impact of molecular size on treatment permeability modifications in each formation as a function of the increased MW. Experimental data from the sandpack regained permeability tests were used to fit the parameters for Equations [1] through [5]; FIG. 9 shows the results.

Developing the practical model provides an effective tool to optimize the MW of a given clay stabilization polymer to minimize reduction in formation permeability. The results from the model were used to help predict the pore size that would result in 50% reduction in permeability during treatment. Analysis of tight North American shale samples has shown that pore radii range from nanopores <10 nm, micropores 10 to 100 nm, mesopores 100 to 1,000 nm, and macropores>1,000 nm; also important are the pore throats of the propped fractures that range in size from 1.4 microns for silica flour to 140 microns for 20/40. Based on the model produced from the sandpack regain permeability, none of the clay stabilization polymers would have a reduction of permeability in induced fractures, natural fractures, or proppant packs composed of proppants 100 mesh (42-micron pore throat) or larger. For packs composed of sub-100 mesh proppants, only the largest 1,000 kDa polymer has a high probability of reducing the permeability by 50% or greater, and for packs composed of silica flour (<325 mesh) proppant, the 120 kDa polymer would exhibit reduction in permeability. To remain mobile in nanopores, the MW for a treatment would have to be less than 0.5 kDa; however, with most formations having very little permeability, even to water, mobility of a polymer is unlikely to have a drastic impact on matrix permeability.

The ideal treatment for North American formation materials should balance the needs for formation stabilization and chemical stabilization. Because all clay stabilizers can effectively protect the swelling potential of a typical shale sample, ideal treatments should be evaluated for impact on the mechanical disaggregation, fines generation, and permanency. These exhibit improved efficacy at higher MW; however, anionic FR compatibility and mobility in tight pore throats require lower MW.

Inorganic salts: potassium chloride at a 1-mol/L offers protection against swelling and mechanical damage, but it is less effective at preventing fines generation and is not permanent. Because it is prone to exchanging with sodium chloride, which was ineffective at stabilizing mechanical damage or fines generation, this treatment is not the most effective for stabilizing North American shale formations.

Oligomers: oligomers between 0.1 and 1.0 kDa control swelling, decrease mechanical disaggregation, control fines generation, and are mobile even in tight pore throats. However, treatments larger than 0.3 kDa are permanent and treatments under 1.0 kDa are compatible with anionic FRs, making this range of clay stabilizers the ideal treatment to control formation and chemical damage for the average North American shale.

Polymers: cationic organic polymers over 1 kDa are the most effective treatments for extreme fluid-induced damage mechanisms, such as sever swelling, mechanical damage, or fines generation, and they are permanent. However, they are not compatible with anionic FR polymers, and they are not mobile in tight pore throats. The advantage of a large MW polymer is that it can be run at very low concentrations and still effectively prevent a fluid-induced damage mechanism. Therefore, for highly fluid sensitive formations, low doses of cationic polymers in compatible fluid systems would be the ideal treatment.

ADDITIONAL DISCLOSURE

The following are non-limiting, specific embodiments in accordance with the present disclosure:

A first aspect, which is a wellbore servicing fluid comprising (a) a cationic formation stabilizer having (i) a molecular weight in a range of from equal to or greater than 0.05 to equal to or less than 2.0 kiloDaltons (kDa), or (ii) cationic charge functional groups of greater than 2 to equal to or less than 5 cationic charges per molecule, or (iii) both (i) and (ii), (b) an anionic friction reducer, and (c) an aqueous fluid.

A second aspect, which is the wellbore servicing fluid of the first aspect, wherein the cationic formation stabilizer comprises an oligomer.

A third aspect, which is the wellbore servicing fluid of the second aspect, wherein the oligomer is composed of 2 to 20 monomeric units, wherein each monomeric unit ranges in weight from 0.01 kDa to 0.3 kDa.

A fourth aspect, which is the wellbore servicing fluid of the second aspect, wherein the oligomer comprises one or more of functional groups selected from the group consisting of (a) 1°-, 2°-, 3°-, or quaternary alkyl, vinyl, aryl amines; (b) 1°-, 2°-, 3°-, or quaternary alkyl, vinyl, aryl, cyclic amines; (c) 1°-, 2°-, 3°-, or quaternary cyclic alkyl, vinyl, aryl, diamines; (d) 1°-, 2°-, 3°-, or quaternary cyclic alkyl, vinyl, aryl, triamines; (e) 1°-, 2°-, 3°-, or quaternary alkyl, vinyl, aryl, aminoalcohol moieties; (f) diol or glycerol alcohol moiety; (g) 1,2-propanediol-3-trialkyl ammonium salts; (h) aminoacid moiety; (i) 1°-, 2°-, 3°-, or quaternary alkyl, vinyl, aryl, aminoformamidine; (j) 1°-, 2°-, 3°-, or quaternary alkyl, vinyl, aryl, cyclic aminoformamidine; (k) 1°-, 2°-, 3°-, or quaternary pyridinylmethly-aminoformamidine; (l) 1°-, 2°-, 3°-, or quaternary aceto-aminoformamidine; (m) bisquaternary amine; (n) betaine monohydrate; and (o) combinations thereof.

A fifth aspect, which is the wellbore servicing fluid of the first aspect, wherein the cationic formation stabilizer comprises arginine, lysine, polylysine, guanidine, ethoxylated amines, polyoxyalkylene amines, polyoxyethylene amines, polyoxypropylene amines, polyoxyalkylene cocamines, polyoxyethylene cocamines, polyoxypropylene cocamines, polyoxyalkylene tallow amines, polyoxyethylene tallow amines, polyoxypropylene tallow amines, polyoxyalkylene lauryl amines, polyoxyethylene lauryl amines, polyoxypropylene lauryl amines polyoxyalkylene amidoamines, polyoxypropylene amidoamine, polyether amines, polyether diamine, polyamino polyether, or combinations thereof.

A sixth aspect, which is the wellbore servicing fluid of the first aspect, wherein the cationic formation stabilizer comprises a compound according to Structure I, II, or III:

(I)

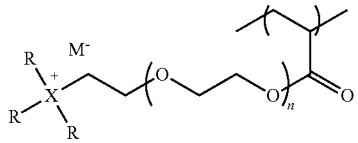

1) n = 1-15, X = N, R = CH$_2$CH$_3$;
   M = any halogen, sulfate, sulfonate
2) n = 1-15, X = P, R = CH$_2$CH$_3$;
   M = any halogen, sulfate, sulfonate
3) n = 1-15, X = P, R = C(CH$_3$)$_3$;
   M = any halogen, sulfate, sulfonate
4) n = 1-15, X = P, R = (CH$_2$)$_3$OH;
   M = any halogen, sulfate, sulfonate
5) n = 1-15, X = P, R = C$_6$H$_5$;
   M = any halogen, sulfate, sulfonate (II)

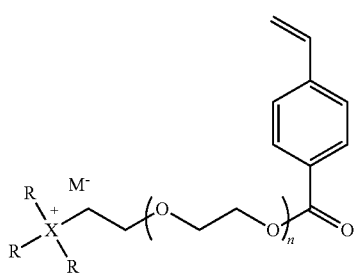

6) n = 1-15, X = N, R = CH$_2$CH$_3$;
   M = any halogen, sulfate, sulfonate
7) n = 1-15, X = P, R = CH$_2$CH$_3$;
   M = any halogen, sulfate, sulfonate
8) n = 1-15, X = P, R = C(CH$_3$)$_3$;
   M = any halogen, sulfate, sulfonate
9) n = 1-15, X = P, R = (CH$_2$)$_3$OH;
   M = any halogen, sulfate, sulfonate
10) n = 1-15, X = P, R = C$_6$H$_5$;
    M = any halogen, sulfate, sulfonate (III)

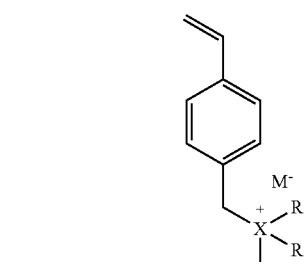

11) X = N, R = CH$_2$CH$_3$; M = any halogen, sulfate, sulfonate
12) X = P, R = CH$_2$CH$_3$; M = any halogen, sulfate, sulfonate
13) X = P, R = C(CH$_3$)$_3$; M = any halogen, sulfate, sulfonate
14) X = P, R = (CH$_2$)$_3$OH; M = any halogen, sulfate, sulfonate
15) X = P, R = C$_6$H$_5$; M = any halogen, sulfate, sulfonate A seventh aspect, which is the wellbore servicing fluid of the first aspect, wherein the cationic formation stabilizer comprises a guanidine compound.

An eighth aspect, which is the wellbore servicing fluid of the first aspect, wherein the cationic formation stabilizer comprises a cationic guanidinium-containing compound (GCC) comprising the moiety of Structure IV:

Structure IV

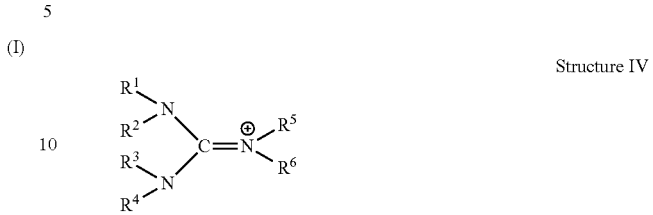

wherein $R^1$, $R^2$, $R^3$, $R^4$, $R^5$ and $R^6$ are each independently hydrogen, a halogen or an organyl group.

A ninth aspect, which is the wellbore servicing fluid of the eighth aspect, wherein the GCC is an oligomer as represented by the compound of Structure V:

Structure V

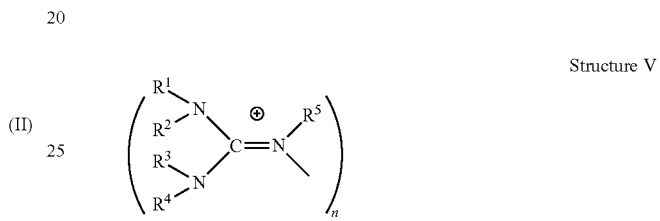

wherein $R^1$, $R^2$, $R^3$, $R^4$, and $R^5$ are each independently hydrogen, a halogen or an organyl group and the GCC has a molecular weight ranging from about 50 Daltons (Da) to about 2000 Daltons (Da).

A tenth aspect, which is the wellbore servicing fluid of any of the first to the ninth aspects, wherein the cationic formation stabilizer is present in an amount in a range of from about 0.001 weight percent to about 3 weight percent, alternatively from about 0.01 weight percent to about 3 weight percent, alternatively from about 0.01 weight percent to about 2 weight percent, alternatively from about 0.01 weight percent to about 1 weight percent, alternatively from about 0.5 weight percent to about 1 weight percent, alternatively from about 0.1 weight percent to about 0.6 weight percent, alternatively from about 0.2 weight percent to about 0.4 weight percent based on the total weight of the wellbore servicing fluid.

An eleventh aspect, which is the wellbore servicing fluid of any of the first to the tenth aspects, wherein the anionic friction reducer has a molecular weight in a range of equal to or greater than 5 MM Da to equal to or less than 25 MM Daltons (Da).

A twelfth aspect, which is the wellbore servicing fluid of any of the first to the eleventh aspects, wherein the anionic friction reducer comprises one or more functional groups selected from the group consisting of (a) alkyl-, vinyl-, aryl-, amide; (b) dialkyl-, divinyl-, diaryl-, amide; (c) carboxylic acid; (d) carboxylic acid mono- or multi-valent metal salt; (e) carboxylic acid ammonium salt; (f) carboxylic acid alkyl-, vinyl-, aryl ammonium salt; (g) carboxylic acid oxyethyltrimethylammonium salt; (h) carboxy-1-propane-sulfonic acid; (i) carboxy-1-proanesulfonic acid mono- and multivalent salts; (j) Sulfopropyl salt; (k) Amido-2-methyl-propane sulfonic acid; (l) Amido-2-methylpropane sulfonic acid mono- or multi-valent metal salt; (m) amidopropyl timethylammonium salt; (n) carboxylic acid methyl(C1)-thru octydecyl(C18) ester; and (o) combinations thereof.

A thirteenth aspect, which is the wellbore servicing fluid of any of the first to the twelfth aspects, wherein the anionic friction reducer is present in an amount in a range of from about 0.001 weight percent to about 3 weight percent, alternatively from about 0.01 weight percent to about 3 weight percent, alternatively from about 0.01 weight percent to about 2 weight percent, alternatively from about 0.01 weight percent to about 1 weight percent, alternatively from about 0.05 weight percent to about 1 weight percent, alternatively from about 0.075 weight percent to about 0.9 weight percent, alternatively from about 0.1 weight percent to about 0.7 weight percent based on the total weight of the wellbore servicing fluid.

A fourteenth aspect, which is the wellbore servicing fluid of any of the first to the thirteenth aspects, further comprising (d) a proppant.

A fifteenth aspect, which is the wellbore servicing fluid of the fourteenth aspect, further comprising (e) a gelling agent, wherein the gelling agent has a molecular weight in a range of equal to or greater than 1.2 MM Da to equal to or less than 5 MM Daltons (Da).

A sixteenth aspect, which is the wellbore servicing fluid of the fifteenth aspect, wherein the gelling agent comprises a guar, hydrdoxypropyl guar (HPG), carboxymethyl guar (CMG), carboxymethyl hydroxyl propyl guar (CMHPG), hydroxyethyl cellulose (HEC), carboxymethyl hydroxyethyl cellulose, carboxymethyl cellulose (CMC), xanthan, pectins, diutans, or combinations thereof.

A seventeenth aspect, which is the wellbore servicing fluid of the fifteenth or the sixteenth aspect, wherein the gelling agent is present in an amount in a range of from about 0.01 weight percent to about 3 weight percent, alternatively from about 0.01 weight percent to about 2 weight percent, alternatively from about 0.01 weight percent to about 1 weight percent, alternatively from about 0.1 weight percent to about 1 weight percent, alternatively from about 0.3 weight percent to about 0.85 weight percent, alternatively from about 0.5 weight percent to about 0.75 weight percent based on the total weight of the wellbore servicing fluid.

An eighteenth aspect, which is the wellbore servicing fluid of any of the first to the seventeenth aspects, wherein the cationic formation stabilizer produces equal to or less than 0.5 mg/pore volume (PV) of fines as determined by measuring the amount of fine particulate particles emitted from a 1-inch inside diameter, 10-inch length sandpack column comprising 10% illite at a treatment flow rate ranging from 5 to 25 mL/min of the servicing fluid.

A nineteenth aspect, which is the wellbore servicing fluid of the eighteenth aspect, wherein the cationic formation stabilizer has a permanency of equal to or greater than 30 pore volumes (PV) as determined by measuring the amount of fine particulate particles in mg/PV emitted from a 1-inch inside diameter 10-inch length of a previously treated sandpack column comprising 10% illite at a flow rate ranging from 5 to 25 mL/min of water and the amount of fine particular particles recovered does not exceed 0.5 mg/PV prior to at least 30 PVs of water being passed through the previously treated sandpack column.

A twentieth aspect, which is the wellbore servicing fluid of the nineteenth aspect, wherein the cationic formation stabilizer and the anionic friction reducer are visibly clear when mixed.

A twenty-first aspect, which is a method of servicing a wellbore penetrating a subterranean formation, comprising placing a wellbore servicing fluid into the wellbore, wherein the subterranean formation comprises shale and wherein the wellbore servicing fluid comprises (a) a cationic formation stabilizer having (i) a molecular weight in a range of from equal to or greater than 0.05 to equal to or less than 2.0 kiloDaltons (kDa), or (ii) cationic charge functional groups of greater than 2 to equal to or less than 5 cationic charges per molecule, or (iii) both (i) and (ii); (b) an anionic friction reducer; and (c) an aqueous fluid.

A twenty-second aspect, which is the method of the twenty-first aspect, wherein the shale comprises nanopores having pore radii of less than 10 nm and wherein the cationic formation stabilizer has a molecular weight in a range of from equal to or greater than 0.1 to equal to or less than 0.5 kDa.

A twenty-third aspect, which is the method of the twenty-first or the twenty-second aspect, wherein the subterranean formation has a (ultra-low) permeability in a range of from equal to or greater than 1 nD to equal to or less than 500 nD (nanoDarcy).

A twenty-fourth aspect, which is the method of any of the twenty-first to the twenty-third aspects, wherein the shale has a clay content of from 1 to 70 weight percent.

A twenty-fifth aspect, which is the method of any of the twenty-first to the twenty-fourth aspects, wherein the shale has a cation exchange capacity (CEC) from 0 to 30 meq/100 g.

A twenty-sixth aspect, which is the method of any of the twenty-first to the twenty-fifth aspects, wherein the wellbore servicing fluid is a fracturing fluid, a completion fluid, a drilling fluid, a stimulation fluid, or a cementitious fluid.

While embodiments have been shown and described, modifications thereof can be made without departing from the spirit and teachings of this disclosure. The embodiments described herein are exemplary only, and are not intended to be limiting. Many variations and modifications of the embodiments disclosed herein are possible and are within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl and an upper limit, Ru, is disclosed, any number falling within the range is specifically disclosed. In particular, the following numbers within the range are specifically disclosed: R=Rl+k*(Ru-Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of this disclosure. Thus, the claims are a further description and are an addition to the embodiments of this disclosure. The discussion of a reference herein is not an admission that it is prior art, especially any reference that may have a publication date after the priority date of this application.

We claim:

1. A wellbore servicing fluid comprising:
(a) a cationic formation stabilizer having (i) a molecular weight in a range of from equal to or greater than 0.05 to equal to or less than 2.0 kiloDaltons (kDa), or (ii) cationic charge functional groups of greater than 2 to equal to or less than 5 cationic charges per molecule, or (iii) both (i) and (ii) wherein the cationic formation stabilizer comprises a cationic guanidinium-containing compound (GCC) comprising the moiety of Structure IV:

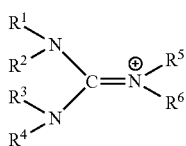

Structure IV wherein $R^1$, $R^2$, $R^3$, $R^4$, $R^5$ and $R^6$ are each independently an organyl group, (b) an anionic friction reducer wherein the anionic friction reducer has a molecular weight in a range of equal to or greater than 5 MM Da to equal to or less than 25 MM Daltons (Da); and (c) an aqueous fluid.

2. The wellbore servicing fluid of claim 1, wherein the cationic formation stabilizer comprises arginine, lysine, polylysine, guanidine, ethoxylated amines, polyoxyalkylene amines, polyoxyethylene amines, polyoxypropylene amines, polyoxyalkylene cocamines, polyoxyethylene cocamines, polyoxypropylene cocamines, polyoxyalkylene tallow amines, polyoxyethylene tallow amines, polyoxypropylene tallow amines, polyoxyalkylene lauryl amines, polyoxyethylene lauryl amines, polyoxypropylene lauryl amines polyoxyalkylene amidoamines, polyoxypropylene amidoamine, polyether amines, polyether diamine, polyamino polyether, or combinations thereof.

3. The wellbore servicing fluid of claim 1, wherein the cationic formation stabilizer comprises a compound according to Structure I, II, or III:

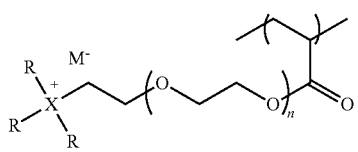
(I)

1) n = 1-15, X = N, R = CH$_2$CH$_3$;
   M = any halogen, sulfate, sulfonate
2) n = 1-15, X = P, R = CH$_2$CH$_3$;
   M = any halogen, sulfate, sulfonate
3) n = 1-15, X = P, R = C(CH$_3$)$_3$;
   M = any halogen, sulfate, sulfonate
4) n = 1-15, X = P, R = (CH$_2$)$_3$OH;
   M = any halogen, sulfate, sulfonate
5) n = 1-15, X = P, R = C$_6$H$_5$;
   M = any halogen, sulfate, sulfonate

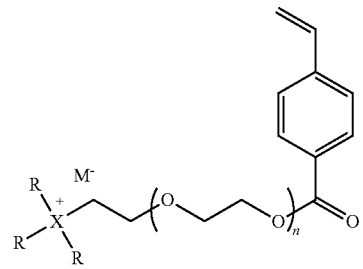
(II)

6) n = 1-15, X = N, R = CH$_2$CH$_3$;
   M = any halogen, sulfate, sulfonate
7) n = 1-15, X = P, R = CH$_2$CH$_3$;
   M = any halogen, sulfate, sulfonate
8) n = 1-15, X = P, R = C(CH$_3$)$_3$;
   M = any halogen, sulfate, sulfonate
9) n = 1-15, X = P, R = (CH$_2$)$_3$OH;
   M = any halogen, sulfate, sulfonate
10) n = 1-15, X = P, R = C$_6$H$_5$;
    M = any halogen, sulfate, sulfonate

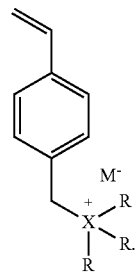
(III)

11) X = N, R = CH$_2$CH$_3$; M = any halogen, sulfate, sulfonate
12) X = P, R = CH$_2$CH$_3$; M = any halogen, sulfate, sulfonate
13) X = P, R = C(CH$_3$)$_3$; M = any halogen, sulfate, sulfonate
14) X = P, R = (CH$_2$)$_3$OH; M = any halogen, sulfate, sulfonate
15) X = P, R = C$_6$H$_5$; M = any halogen, sulfate, sulfonate.

4. The wellbore servicing fluid of claim 1, wherein the cationic formation stabilizer comprises a guanidine compound.

5. The wellbore servicing fluid of claim 1, wherein the cationic formation stabilizer comprises a cationic guanidinium-containing compound (GCC) comprising the moiety of Structure IV:

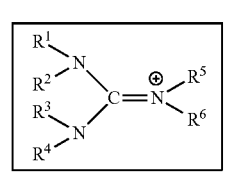

Structure IV wherein $R^1$, $R^2$, $R^3$, $R^4$, $R^5$ and $R^6$ are each independently hydrogen, a halogen or an organyl group.

6. The wellbore servicing fluid of claim 5, wherein the GCC is an oligomer as represented by the compound of Structure V:

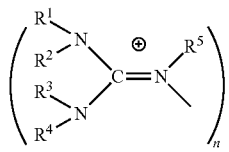

Structure V wherein $R^1$, $R^2$, $R^3$, $R^4$, and $R^5$ are each independently hydrogen, a halogen or an organyl group and the GCC has a molecular weight ranging from about 50 Daltons (Da) to about 2000 Daltons (Da).

7. The wellbore servicing fluid of claim 1, wherein the cationic formation stabilizer is present in an amount in a range of from about 0.001 weight percent to about 3 weight percent based on the total weight of the wellbore servicing fluid.

8. The wellbore servicing fluid of claim 1, wherein the anionic friction reducer comprises one or more functional groups selected from the group consisting of (a) alkyl-, vinyl-, aryl-, amide; (b) dialkyl-, divinyl-, diaryl-, amide; (c) carboxylic acid; (d) carboxylic acid mono- or multi-valent metal salt; (e) carboxylic acid ammonium salt; (f) carboxylic acid alkyl-, vinyl-, aryl ammonium salt; (g) carboxylic acid oxyethyltrimethylammonium salt; (h) carboxy-1-propane-sulfonic acid; (i) carboxy-1-proanesulfonic acid mono- and multivalent salts; (j) Sulfopropyl salt; (k) Amido-2-methyl-propane sulfonic acid; (l) Amido-2-methylpropane sulfonic acid mono- or multi-valent metal salt; (m) amidopropyl timethylammonium salt; (n) carboxylic acid methyl(C1)- thru octydecyl(C18) ester; and (o) combinations thereof.

9. The wellbore servicing fluid of claim 1, wherein the anionic friction reducer is present in an amount in a range of from about 0.001 weight percent to about 3 weight percent, based on the total weight of the wellbore servicing fluid.

10. The wellbore servicing fluid of claim 1, further comprising:
(d) a proppant; and
(e) a gelling agent, wherein the gelling agent has a molecular weight in a range of equal to or greater than 1.2 MM Da to equal to or less than 5 MM Daltons (Da).

11. The wellbore servicing fluid of claim 10, wherein the gelling agent comprises a guar, hydrdoxypropyl guar (HPG), carboxymethyl guar (CMG), carboxymethyl hydroxyl propyl guar (CMHPG), hydroxyethyl cellulose (HEC), carboxymethyl hydroxyethyl cellulose, carboxymethyl cellulose (CMC), xanthan, pectins, diutans, or combinations thereof.

12. The wellbore servicing fluid of claim 10, wherein the gelling agent is present in an amount in a range of from about 0.01 weight percent to about 3 weight percent, based on the total weight of the wellbore servicing fluid.

13. The wellbore servicing fluid of claim 1, wherein the cationic formation stabilizer produces equal to or less than 0.5 mg/pore volume (PV) of fines as determined by measuring the amount of fine particulate particles emitted from a 1-inch inside diameter, 10-inch length sandpack column comprising 10% illite at a treatment flow rate ranging from 5 to 25 mL/min of the servicing fluid.

14. The wellbore servicing fluid of claim 13, wherein the cationic formation stabilizer has a permanency of equal to or greater than 30 pore volumes (PV) as determined by measuring the amount of fine particulate particles in mg/PV emitted from a 1-inch inside diameter 10-inch length of a previously treated sandpack column comprising 10% illite at a flow rate ranging from 5 to 25 mL/min of water and the amount of fine particular particles recovered does not exceed 0.5 mg/PV prior to at least 30 PVs of water being passed through the previously treated sandpack column.

15. The wellbore servicing fluid of claim 14, wherein the cationic formation stabilizer and the anionic friction reducer are visibly clear when mixed.

16. A method of servicing a wellbore penetrating a subterranean formation, comprising:
placing a wellbore servicing fluid into the wellbore, wherein the subterranean formation comprises shale and wherein the wellbore servicing fluid comprises (a) a cationic formation stabilizer having (i) a molecular weight in a range of from equal to or greater than 0.05 to equal to or less than 2.0 kiloDaltons (kDa), or (ii) cationic charge functional groups of greater than 2 to equal to or less than 5 cationic charges per molecule, or (iii) both (i) and (ii); (b) an anionic friction reducer; and (c) an aqueous fluid.

17. A wellbore servicing fluid comprising:
(a) a cationic formation stabilizer comprising a modified guanidium salt having the formula:

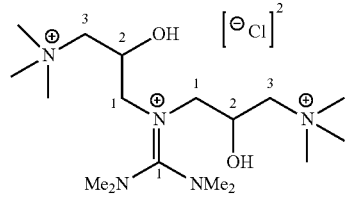

$N^1$-(bis(dimethylamino)methylene)-2-hydroxy-$N^1$-(2-hydroxy-3-(trimethylammonio)propyl)-$N^3,N^3,N^3$-trimethylpropane-1,3-diaminium dichloride
(b) an anionic friction reducer comprising acrylamide and acrylic acid copolymers of the formula:

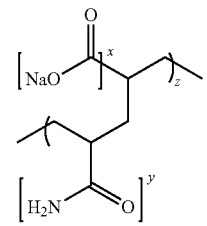

(c) water,
(d) sand, and
(e) carboxymethyl cellulose.

18. The wellbore servicing fluid of claim 17, wherein the cationic formation stabilizer is present in an amount in a range of from about 0.001 weight percent to about 3 weight percent, based on the total weight of the wellbore servicing fluid.

19. The wellbore servicing fluid of claim 17, wherein the anionic friction reducer is present in an amount in a range of from about 0.001 weight percent to about 3 weight percent, based on the total weight of the wellbore servicing fluid.

20. A wellbore servicing fluid comprising:
(a) a cationic formation stabilizer having (i) a molecular weight in a range of from equal to or greater than 0.05 to equal to or less than 2.0 kiloDaltons (kDa), or (ii) cationic charge functional groups of greater than 2 to equal to or less than 5 cationic charges per molecule, or (iii) both (i); (ii) wherein the cationic formation stabilizer comprises a cationic guanidinium-containing compound (GCC) comprising the moiety of Structure IV:

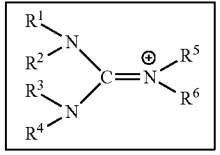

Structure IV wherein $R^1$, $R^2$, $R^3$, $R^4$, $R^5$ and $R^6$ are each independently an organyl group and wherein the formation stabilizer excludes polyvalent metals;
(b) an anionic friction reducer; and
(c) an aqueous fluid.

* * * * *